US012656101B2

(12) United States Patent
Sakai et al.

(10) Patent No.: US 12,656,101 B2
(45) Date of Patent: Jun. 16, 2026

(54) SPATIAL LIGHT MODULATION DEVICE, PROCESSING DEVICE, AND POSITION ESTIMATION METHOD

(71) Applicant: HAMAMATSU PHOTONICS K.K., Hamamatsu (JP)

(72) Inventors: Koichi Sakai, Hamamatsu (JP); Satoru Kobayashi, Hamamatsu (JP); Kazuki Kawai, Hamamatsu (JP); Takashi Sekine, Hamamatsu (JP); Yoshinori Kato, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 60 days.

(21) Appl. No.: 18/846,034

(22) PCT Filed: Feb. 6, 2023

(86) PCT No.: PCT/JP2023/003863
§ 371 (c)(1),
(2) Date: Sep. 11, 2024

(87) PCT Pub. No.: WO2023/188832
PCT Pub. Date: Oct. 5, 2023

(65) Prior Publication Data
US 2025/0189300 A1     Jun. 12, 2025

(30) Foreign Application Priority Data

Mar. 29, 2022     (JP) ................................. 2022-052867

(51) Int. Cl.
G01B 11/00          (2006.01)

(52) U.S. Cl.
CPC ................................. G01B 11/002 (2013.01)

(58) Field of Classification Search
CPC .... G01B 11/002; G02B 26/06; B23K 26/032;
B23K 26/064; G03H 1/2294; G03H 1/30;
(Continued)

(56) References Cited

U.S. PATENT DOCUMENTS

| | | | | |
|---|---|---|---|---|
| 5,334,849 A | * | 8/1994 | Thomas | B23K 26/0665 |
| 11,440,136 B2 | * | 9/2022 | Gauch | G02B 27/0944 |

(Continued)

FOREIGN PATENT DOCUMENTS

| | | |
|---|---|---|
| CN | 202916586 U | 5/2013 |
| CN | 108957716 A | 12/2018 |

(Continued)

OTHER PUBLICATIONS

Itoh, Haruyasu et al., "Holographic Laser Processing Using Spatial Light Phase Modulator," The Review of Laser Engineering, Apr. 2015, vol. 43, No. 4, pp. 227-232.

(Continued)

*Primary Examiner* — Isiaka O Akanbi
(74) *Attorney, Agent, or Firm* — Faegre Drinker Biddle & Reath LLP

(57)     ABSTRACT

In a spatial light modulation device, a detection unit detects light modulated by a spatial light modulation unit. An estimation unit estimates an incident position of the light onto the spatial light modulation unit on the basis of a detection result obtained by the detection unit. A phase pattern set by a pattern setting unit includes a phase pattern arranged to form a plurality of focused light spots on the detection unit using the light modulated in the set phase pattern. The detection unit detects intensity information of the focused light spots. The estimation unit estimates the incident position of the light onto the spatial light modulation unit on the basis of a comparison result obtained from (Continued)

the intensity information of the plurality of focused light spots detected by the detection unit.

13 Claims, 14 Drawing Sheets

(58) Field of Classification Search
CPC ... G03H 2001/0094; G03H 2001/0224; G03H 2001/0491; G03H 2001/085; G03H 2001/2247; G03H 2001/2297; G03H 2225/32; G03H 2240/51; G03H 1/0005; G02F 2203/12; G02F 2203/50; G02F 1/0102
USPC .................. 356/614–624, 217, 445, 521, 317
See application file for complete search history.

(56) References Cited

U.S. PATENT DOCUMENTS

| | | | |
|---|---|---|---|
| 12,472,585 B2* | 11/2025 | Ikku .................. | B23K 26/0823 |
| 2002/0122595 A1* | 9/2002 | Crill ..................... | G06V 10/92 |
| | | | 707/E17.02 |
| 2002/0153362 A1 | 10/2002 | Sandstrom et al. | |
| 2005/0122549 A1* | 6/2005 | Goulanian ........... | G03H 1/0808 |
| | | | 359/3 |
| 2008/0265150 A1 | 10/2008 | Holmes | |
| 2008/0304030 A1 | 12/2008 | Lous | |
| 2010/0321675 A1* | 12/2010 | Huang ................. | A61B 3/1015 |
| | | | 356/217 |
| 2011/0176190 A1* | 7/2011 | Golan ..................... | G03H 1/32 |
| | | | 359/9 |
| 2013/0314683 A1* | 11/2013 | Watanabe ........... | G03F 7/70116 |
| | | | 355/71 |
| 2015/0146196 A1* | 5/2015 | Huang ............... | G01M 11/0257 |
| | | | 356/121 |
| 2018/0031944 A1 | 2/2018 | McKnight | |
| 2021/0048692 A1* | 2/2021 | Sakai ........................ | G02F 1/29 |
| 2021/0146482 A1* | 5/2021 | Nomura ............... | B23K 26/032 |

FOREIGN PATENT DOCUMENTS

| | | |
|---|---|---|
| CN | 111273451 A | 6/2020 |
| JP | H7-290264 A | 11/1995 |
| JP | 2011-031284 A | 2/2011 |
| JP | 2012-238012 A | 12/2012 |
| JP | 2014-236795 A | 12/2014 |
| JP | 2020-008879 A | 1/2020 |

OTHER PUBLICATIONS

Klauss, A. et al., "Binary phase masks for easy system alignment and basic aberration sensing with spatial light modulators in STED microscopy," Scientific Reports, Nov. 16, 2017, vol. 7, No. 15699, pp. 1-11.
International Preliminary Report on Patentability mailed Oct. 10, 2024 for PCT/JP2023/003863.
Supplementary European Search Report for EP Patent Application No. 23778868.2, Issued on Dec. 22, 2025, 9 pages.
Decision on Grant received from Russia patent application No. 2024129967 mailed on Mar. 19, 2026, 20 pages (6 pages English Translation and 14 pages Original Copy).

* cited by examiner

PATTERN SETTING UNIT 31

INFORMATION ACQUISITION UNIT 32

COMPARISON UNIT 33

POSITION ADJUSTMENT UNIT 34

ESTIMATION UNIT 35

(a)

(b)

(b)

(a)

(b)

(a)

SPATIAL LIGHT MODULATION DEVICE, PROCESSING DEVICE, AND POSITION ESTIMATION METHOD

TECHNICAL FIELD

The present invention relates to a spatial light modulation device, a processing device, and a position estimation method.

BACKGROUND ART

A known processing device processes a workpiece by irradiating it with light (such as Non Patent Literature 1). Such a processing device modulates light using a phase pattern and irradiates the modulated light onto the workpiece, thereby processing the workpiece.

CITATION LIST

Non Patent Literature

Non Patent Literature 1: Haruyasu Ito, Satoshi Hasegawa, Yoshio Hayasaki, Haruyoshi Toyoda, "Holographic laser processing using spatial light phase modulators", The Review of Laser Engineering, Vol. 43, No. 4, pp. 227-232

Non Patent Literature 2: "Binary phase masks for easy system alignment and basic aberration sensing with spatial light modulators in STED microscopy", Scientific Reports 7, Article number: 15699 (2017)

SUMMARY OF INVENTION

Technical Problem

A processing device modulates light in a spatial light modulation unit that displays a phase pattern. The spatial light modulation unit includes, for example, a spatial light modulator (SLM). Light is modulated by the phase pattern formed by the SLM. For example, the workpiece is irradiated with the modulated light by a computer-generated hologram (CGH) formed in the SLM. In such a configuration, a challenge is the misalignment relative to the phase pattern of the light incident on the phase pattern.

In Non-Patent Literature 1, an image formed by the CGH is captured and observed by an image-capture device to adjust the phase pattern displayed on the spatial light modulation unit. In this image-capture device, the far field pattern (FFP) of the light modulated in the phase pattern is captured. In this configuration, the CGH displayed on the spatial light modulation unit makes it possible to determine whether an image is being formed, but it is difficult to identify the incident position of the light onto the spatial light modulation unit. For this reason, in the case where the incident light on the phase pattern and the phase pattern are misaligned, it is difficult to adjust a positional relationship between the phase pattern and the incident light on the phase pattern.

Non Patent Literature 2 describes that the spatial light modulation unit forms the point spread function as an FFP, and an image of the formed point spread function is observed. In this configuration, even if an aberration caused by misalignment of the optical system is identified, it is difficult to specify the incident position of the light to the spatial light modulation unit.

It is also considerable that the near field pattern (NFP) of the incident light on the phase pattern is captured by an image-capture device, and the movement of the NFP in the captured image is observed. The NFP in the captured image moves relatively together with the incident light onto the spatial light modulation unit. For this reason, if the field of view of the captured image is strictly associated with the position of the spatial light modulation unit, the incident position of the incident light onto the spatial light modulation unit can also be specified depending on the position of the NFP in the captured image. However, external factors such as vibration or changes in ambient temperature may cause a misalignment between the field of view of the captured image and the position of the spatial light modulation unit. Thus, the estimation of the incident position of light incident on the spatial light modulation unit from the captured image of the NFP necessitates the calibration of the field of view of the captured image and the position of the spatial light modulation unit.

The aspects of the present invention herein are intended to provide a spatial light modulation device, a processing device, and a position estimation method, capable of easily estimating the incident position of light onto the spatial light modulation unit.

Solution to Problem

A spatial light modulation device according to one aspect of the present invention includes a spatial light modulation unit, a pattern setting unit, a detection unit, and an estimation unit. The spatial light modulation unit displays a phase pattern used for modulating incident light and modulates the light in accordance with the phase pattern. The pattern setting unit sets a phase pattern to be displayed on the spatial light modulation unit. The detection unit detects light modulated by the spatial light modulation unit. The estimation unit estimates the incident position of the light onto the spatial light modulation unit on the basis of a detection result obtained by the detection unit. The phase pattern set by the pattern setting unit includes a phase pattern arranged to form a plurality of focused light spots on the detection unit using the light modulated by the set phase pattern. The detection unit detects intensity information of the focused light spots. The estimation unit estimates the incident position of the light onto the spatial light modulation unit on the basis of a comparison result obtained from the intensity information of the plurality of focused light spots detected by the detection unit.

In the aspect described above, the phase pattern set by the pattern setting unit includes the phase pattern arranged to form the plurality of focused light spots on the detection unit using the light modulated by the spatial light modulation unit. The estimation unit estimates the incident position of the light onto the spatial light modulation unit on the basis of the comparison result obtained from pieces of the intensity information of the plurality of focused light spots. The inventors of the present application have found that the comparison result of the intensity information of the plurality of focused light spots allows for easy estimation of the incident position of light on the phase pattern. This configuration enables easy estimation of the incident position of light onto the spatial light modulation unit.

In the aspect described above, the estimation unit may estimate the incident position of light onto the spatial light modulation unit on the basis of the positional relationship between the phase pattern and the incident light on the phase pattern. The positional relationship may be a positional relationship where the intensities of at least two of the plurality of focused light spots are equal to each other. In this case, the incident position of light onto the spatial light modulation unit can be estimated even more accurately.

In the aspect described above, the estimation unit may estimate the incident position of light onto the spatial light modulation unit on the basis of a comparison result of intensity information of a pair of focused light spots formed by light incident on a pair of adjacent regions in the phase pattern in a first direction and a comparison result of intensity information of a pair of focused light spots formed by light incident on a pair of adjacent regions in the phase pattern in a second direction. The second direction intersects with the first direction. In this case, the incident position of light onto the spatial light modulation unit can be estimated in both the first direction and the second direction. As a result, the incident position of light onto the spatial light modulation unit can be estimated more accurately.

In the aspect described above, the spatial light modulation device may further include a position adjustment unit. The position adjustment unit may adjust the positional relationship between the phase pattern and the incident light on the phase pattern on the basis of the intensity information of the focused light spots. The detection unit may further detect intensity information of the plurality of focused light spots after the adjustment of the positional relationship by the position adjustment unit. The estimation unit may estimate the incident position of the light onto the spatial light modulation unit on the basis of a comparison result of the intensity information of the plurality of focused light spots detected after the adjustment of the positional relationship. In this case, the positional relationship between the phase pattern and the incident light on the phase pattern may be further adjusted using the intensity information after the adjustment of the positional relationship between the phase pattern and the incident light on the phase pattern. Thus, the positional relationship between the phase pattern and the incident light on the phase pattern may be adjusted more easily and accurately.

In the aspect described above, the position adjustment unit may adjust the positional relationship by executing at least one of the following: changing the phase pattern displayed on the spatial light modulation unit and changing the optical axis position of the incident light on the phase pattern. In this case, the positional relationship between the phase pattern and the incident light on the phase pattern may be further easily adjusted.

In the aspect described above, the device may further include a position adjustment unit that adjusts the positional relationship between the phase pattern and the incident light on the phase pattern on the basis of the intensity information of the focused light spots. The position adjustment unit may adjust the positional relationship by executing at least one of the following: changing the phase pattern displayed on the spatial light modulation unit and changing the optical axis position of the incident light on the phase pattern. In this case, the positional relationship between the phase pattern and the incident light on the phase pattern may be further easily adjusted.

In the aspect described above, the position adjustment unit may adjust the positional relationship on the basis of intensity information of the multiple focused light spots so that the intensity ratio of the multiple focused light spots approaches a value of 1. In this case, the incident position of the light onto the spatial light modulation unit can be estimated more easily and accurately.

In the aspect described above, the pattern setting unit may set a plurality of the phase patterns with different configurations as the phase pattern arranged to form multiple focused light spots on the detection unit. The spatial light modulation unit may sequentially display the plurality of the phase patterns. The estimation unit may estimate the incident position of the light onto the spatial light modulation unit on the basis of intensity information of the focused light spots formed by each of the plurality of the phase patterns. In this case, the positional relationship between the phase pattern and the incident light on the phase pattern can be adjusted more easily and accurately.

In the aspect described above, each of the plurality of phase patterns may include multiple types of sub-patterns. The multiple types of sub-patterns are located in different regions in the phase pattern, each forming a different focused light spot. The plurality of phase patterns may differ in arrangement configurations of regions where the multiple types of sub-patterns are located. In this case, the intensity information of the respective focused light spots may differ for each phase pattern. Thus, the incident position of the incident light on the phase pattern may be more easily estimated. Thus, the incident position of the light in the spatial light modulation unit may be more easily estimated.

In the aspect described above, the detection unit may include an image-capture device that acquires an image of the focused light spots formed in the image-capture region. The captured image may include intensity information of the focused light spots and position information of the focused light spots. The estimation unit may estimate the incident position of the light in the spatial light modulation unit on the basis of the intensity information of the focused light spots and the position information of the focused light spots included in the captured image. In this case, the intensity information of the focused light spots can be easily classified by the position information of the focused light spots in the captured image. Thus, the incident position of the incident light on the phase pattern can be more easily estimated.

A processing device according to another aspect of the present invention includes the spatial light modulation device described above and a processing unit. The processing unit irradiates the workpiece with light modulated by the spatial light modulation unit. In this case, the misalignment between the phase pattern and the incident light on the phase pattern can be suppressed by estimating the incident position of the light onto the spatial light modulation unit. According to this processing device, the light modulated by the spatial light modulation unit is guided not only to the detection unit but also to the workpiece, so that the workpiece can be processed more accurately by the light modulated by the phase pattern.

In the other aspect described above, the pattern setting unit may set at least one of a phase pattern for the incident position estimation and a phase pattern for processing as a phase pattern to be displayed on the spatial light modulation unit. The phase pattern used for the incident position estimation is used to estimate the incident position. The phase pattern used for processing is used by the processing unit to process the workpiece. In this case, after the incident position of the light onto the spatial light modulation unit is estimated by the phase pattern used for the incident position estimation, the workpiece can be processed by the phase pattern used for processing. Thus, the workpiece can be processed in a state in which the misalignment between the light incident on the phase pattern used for processing and the phase pattern used for processing is suppressed.

A position estimation method according to yet another aspect of the present invention includes displaying a phase pattern in a spatial light modulation unit that modulates the incident light, and making light incident on the phase pattern. The phase pattern is configured to form a plurality of focused light spots in accordance with the incidence of light. The phase estimation method further includes detecting intensity information of the plurality of focused light spots formed by the incidence of light, comparing pieces of the intensity information of the detected multiple focused light spots, and estimating the incident position of light onto the spatial light modulation unit. The incident position of light onto the spatial light modulation unit is estimated on the basis of the comparison result of the intensity information of the plurality of focused light spots.

In the other aspect described above, the phase pattern is configured to form a plurality of focused light spots in response to the incidence of light. The incident position of light onto the spatial light modulation unit is estimated on the basis of the comparison result of the intensity information of the plurality of focused light spots. The comparison result of the intensity information of the plurality of focused light spots allows for easy estimation of the incident position of light on the phase pattern. Thus, the incident position of the light onto the spatial light modulation unit can be easily estimated.

Advantageous Effects of Invention

Each aspect of the present invention can provide a spatial light modulation device, a processing device, and a position estimation method, capable of easily estimating the incident position of light on a spatial light modulation unit.

DESCRIPTION OF EMBODIMENTS

Figure 1:
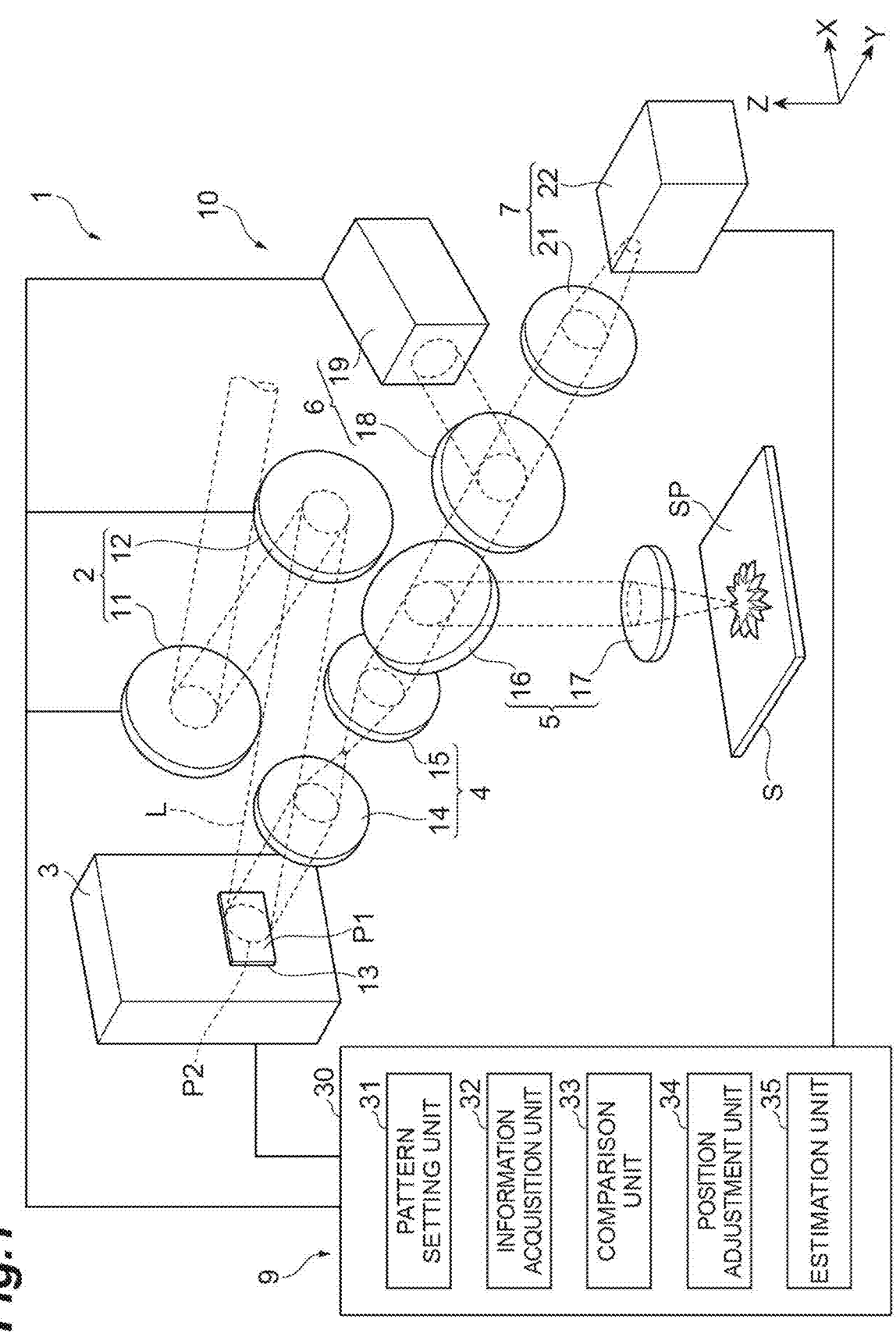
FIG. 1 is a schematic diagram illustrating an example of a processing device according to an embodiment.

Embodiments of the present invention will now be described in detail with reference to the accompanying drawings. Moreover, herein, the same elements or elements having the same functions will be designated by the same reference numerals, and redundant descriptions will be omitted.

The configuration of a processing device according to the present embodiment is first described with reference to FIG. 1. FIG. 1 is a schematic perspective view illustrating an exemplary processing device according to the present embodiment.

The processing device 1 irradiates a workpiece S with light L to process the workpiece S into a desired shape. The light L applied onto the workpiece S is, for example, laser light. The processing device 1 includes an optical system. In FIG. 1, the light L guided by the optical system is indicated by a dashed line. The processing device 1 makes the light L incident into a phase pattern and irradiates the workpiece S with the light L modulated in the phase pattern.

The processing device 1 includes an optical axis adjustment unit 2, a spatial light modulation unit 3, an image transfer unit 4, a processing unit 5, a monitor unit 6, a detection unit 7, and a control unit 9. The processing device 1 may be further provided with a light source (not illustrated). The light source is, for example, a laser. The processing device 1 displays a phase pattern P1 in the spatial light modulation unit 3 and processes the workpiece S with the light L modulated by the phase pattern P1 of the spatial light modulation unit 3. The processing device 1 includes a spatial light modulation device 10 that estimates an incident position P2 of the light L onto the spatial light modulation unit 3. The phrase "estimation of the incident position of the light L onto the spatial light modulation unit" herein means at least one of estimating the incident position P2 of the light L already incident on the spatial light modulation unit 3 and estimating the appropriate incident position P2 on the spatial light modulation unit 3. The spatial light modulation device 10 includes at least the spatial light modulation unit 3, the detection unit 7, and the control unit 9. The spatial light modulation device 10 may also include the optical axis adjustment unit 2, the image transfer unit 4, and the monitor unit 6.

The optical axis adjustment unit 2 guides the light L incident from the light source to the spatial light modulation unit 3. The optical axis adjustment unit 2 includes, for example, lenses 11 and 12. In one example, the light L incident from the light source is guided to the spatial light modulation unit 3 via the lenses 11 and 12. The optical axis adjustment unit 2 adjusts the optical axis of the light L emitted from the lenses 11 and 12 by changing at least one of the position and orientation of the lenses 11 and 12. The optical axis adjustment unit 2 changes the incident position P2 at which the light L enters the spatial light modulation unit 3 by adjusting the optical axis of the light L emitted from the lenses 11 and 12.

The spatial light modulation unit 3 modulates the light L being incident and emits the modulated light. The spatial light modulation unit 3 displays a phase pattern P1 used to modulate the incident light L. The spatial light modulation unit 3 includes a display unit 13 that displays the phase pattern P1. The spatial light modulation unit 3 modulates the incident light L by the phase pattern P1. The spatial light modulation unit 3 includes, for example, a spatial light modulator (SLM). In this case, the display unit 13 includes a plurality of pixels. Thus, the phase pattern P1 includes a plurality of pixels. The phase pattern P1, for example, diffracts the light L incident on the phase pattern P1. The light L incident on the phase pattern P1 displayed on the spatial light modulation unit 3 is modulated depending on the configuration of the phase pattern P1. The spatial light modulation unit 3 sequentially displays a plurality of mutually different phase patterns P1 in response to a control signal input from the control unit 9.

Figure 2:
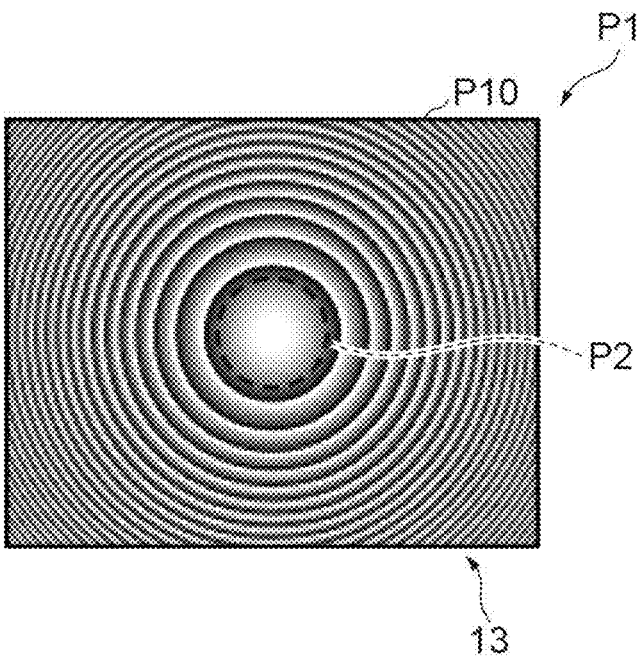
FIG. 2 is a plan view illustrating an example of a phase pattern used for processing.
Figure 3:
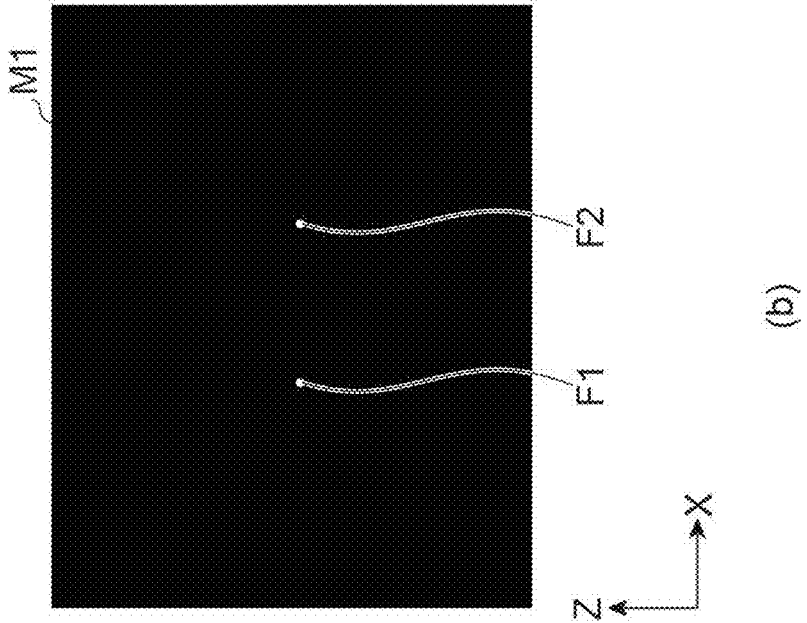
FIG. 3A is a plan view illustrating an example of a phase pattern used for an incident position estimation.
FIG. 3B is a diagram illustrating an image captured by an intensity detection unit.
Figure 3:
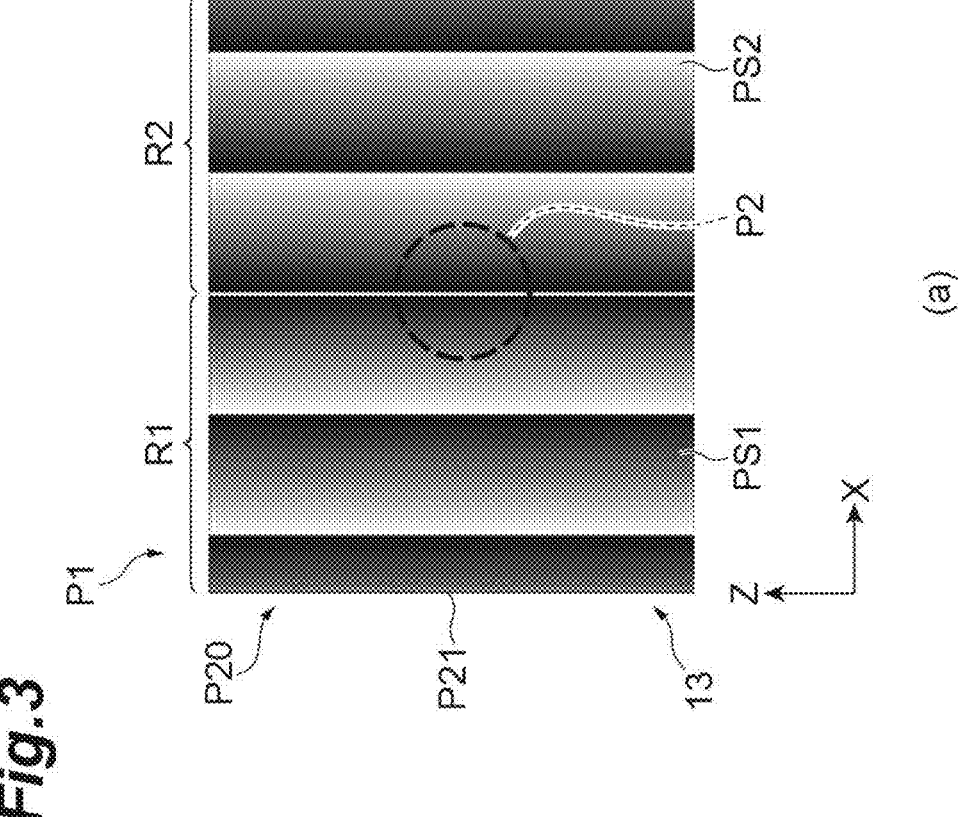
Figure 4:
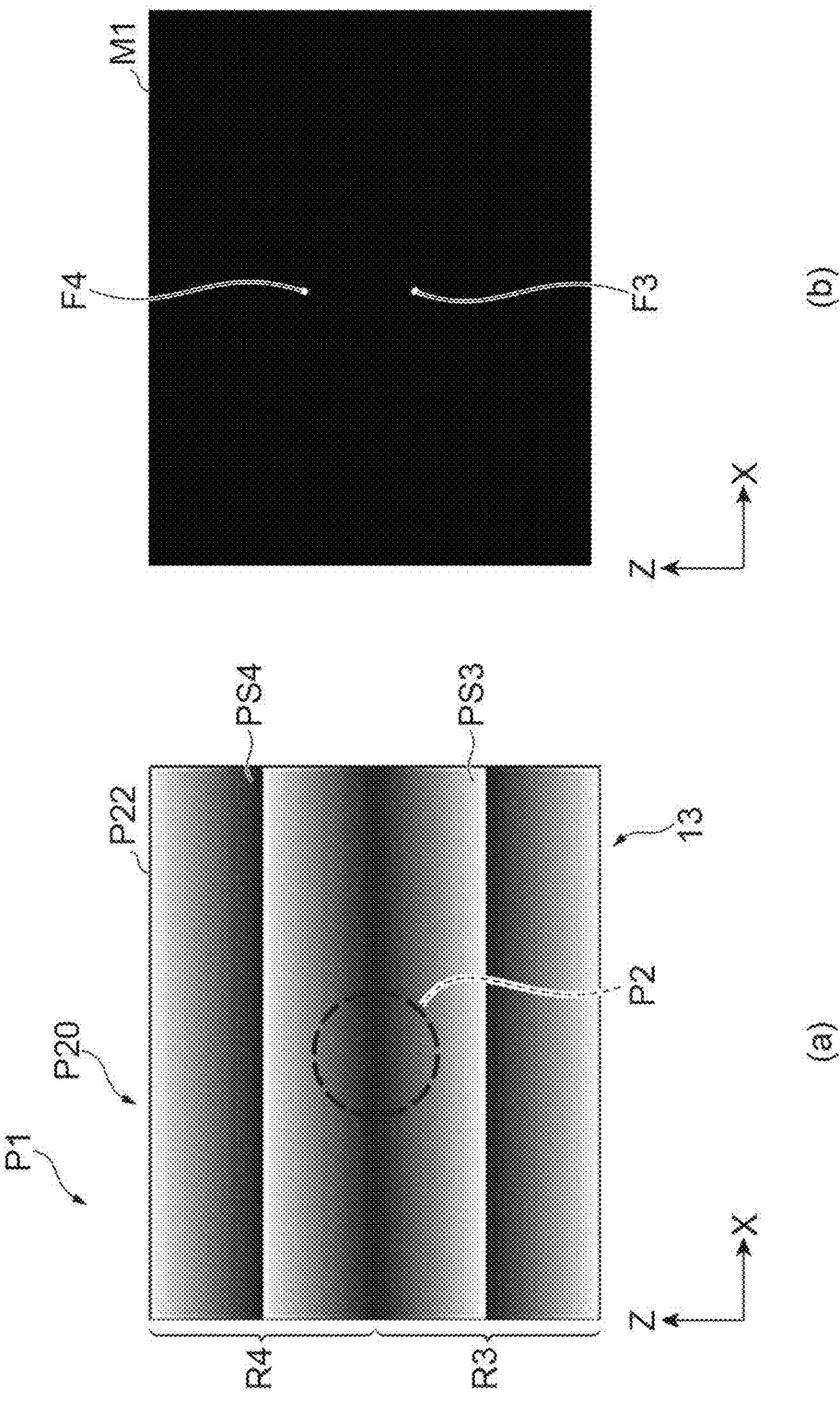
FIG. 4A is a plan view illustrating an example of a phase pattern used for an incident position estimation.
FIG. 4B is a diagram illustrating an image captured by an intensity detection unit.

The spatial light modulation unit 3 displays at least one of a phase pattern P10 used for processing and a phase pattern P20 used for incident position estimation as the phase pattern P1. FIGS. 2, 3A, and 4A illustrate an example of the phase pattern P1 displayed by the spatial light modulation unit 3. In FIGS. 2, 3A, and 4A, the incident position P2 of the light L incident on the phase pattern P1 is indicated by a dashed line. The phase pattern displayed by the spatial light modulation unit 3 is hereinafter simply referred to as a "phase pattern".

The phase pattern P10 is the phase pattern P1 used for processing the workpiece S by the processing unit 5. The phase pattern P10 is configured to form the light L for processing the workpiece S by the light L modulated in the phase pattern P10. The phase pattern P10 forms a focused light spot on a processing surface SP of the workpiece S.

FIG. 2 illustrates an example of the phase pattern P10 used for processing. In FIG. 2, the phase pattern P10 is, for example, a phase pattern that forms a virtual Fresnel lens. In other words, the phase pattern P10 illustrated in FIG. 2 is a Fresnel lens-shaped phase pattern. The phase pattern P10 may be a phase pattern that forms a virtual lens other than a Fresnel lens. The phase pattern P10 may be a phase pattern used for purposes other than forming a virtual lens.

The phase pattern P10 illustrated in FIG. 2 is formed concentrically. The incident position P2 of the incident light illustrated in FIG. 2 is located at the center of the phase pattern P10. The light L that is incident at the incident position P2 is modulated by the phase pattern P10 and is guided to the workpiece S.

FIGS. 3A and 4A illustrate examples of the phase pattern P20 used for the incident position estimation. FIGS. 3B and 4B illustrate examples of the focused light spot detected by the detection unit 7. FIGS. 3B and 4B illustrate an image M1 captured by the intensity detection unit 22.

The phase pattern P20 used for the incident position estimation is a phase pattern used for the incident position estimation. The phase pattern P20 is configured to form the focused light spot on the detection unit 7 depending on the incidence of the light L. The focused light spot is formed by the light L modulated in the phase pattern P20. The phase pattern P20 includes multiple types of sub-patterns. The multiple types of sub-patterns are located in different regions of the phase pattern P20, each forming different focused light spots.

In the present embodiment, the phase pattern P20 used for the incident position estimation includes a phase pattern P21 used for the incident position estimation and a phase pattern P22 used for the incident position estimation. As illustrated in FIG. 3A and FIG. 4A, the phase pattern P21 and the phase pattern P22 have different types of configurations. As illustrated in FIG. 3B, the phase pattern P21 is configured to form multiple focused light spots F1 and F2 on the detection unit 7. As illustrated in FIG. 4B, the phase pattern P22 is configured to form a plurality of focused light spots F3 and F4 on the detection unit 7. The arrangement direction of the plurality of focused light spots F1 and F2 formed by the phase pattern P21 is different from the arrangement direction of the plurality of focused light spots F3 and F4 formed by the phase pattern P22. The arrangement direction of the plurality of focused light spots F1 and F2 formed by the phase pattern P21 intersects with the arrangement direction of the plurality of focused light spots F3 and F4 formed by the phase pattern P22.

The spatial light modulation unit 3 sequentially displays, for example, the plurality of phase patterns P21 having mutually different configurations. The plurality of phase patterns P21 mutually differ in terms of the arrangement configuration of the region where the plurality of types of sub-patterns is located in the respective phase patterns P21. Furthermore, the spatial light modulation unit 3 sequentially displays the plurality of phase patterns P22 having mutually different configurations. The plurality of phase patterns P22 mutually differ in terms of the arrangement configuration of the region where the plurality of types of sub-patterns are located in the respective phase patterns P22.

The phase pattern P21 includes a sub-pattern PS1 located in a region R1 and a sub-pattern PS2 located in a region R2. The regions R1 and R2 are regions into which the display unit 13 is divided, for example, in the X-axis direction. The regions R1 and R2 are mutually adjacent in the left-right direction. The regions R1 and R2 are arranged in the left-right direction, and the display unit 13 is constituted by the regions R1 and R2. Herein, the "left-right direction" corresponds to the horizontal direction, that is, the X-axis direction. The region R1 is located to the left of the region R2. In the example illustrated in FIG. 3A, the regions R1 and R2 are configured to divide the phase pattern P21 horizontally into two halves. The boundary between the regions R1 and R2 extends along the Z-axis direction.

The sub-patterns PS1 and PS2 are arranged in the left-right direction. The sub-patterns PS1 and PS2 are arranged to form focused light spots F1 and F2 at different positions from each other. The sub-pattern PS1 is configured to form the focused light spot F1. The sub-pattern PS2 is configured to form the focused light spot F2. As illustrated in FIG. 3B, the phase pattern P21 is configured to arrange the focused light spots F1 and F2 in the left-right direction.

The phase pattern P22 includes a sub-pattern PS3 located in a region R3 and a sub-pattern PS4 located in a region R4. The regions R3 and R4 are, for example, regions into which the display unit 13 is divided in the Z-axis direction. The regions R3 and R4 are mutually adjacent in the up-down direction. The regions R3 and R4 are arranged in the up-down direction, and the display unit 13 is constituted by the regions R3 and R4. Herein, the "up-down direction" corresponds to the vertical direction, i.e., the Z-axis direction. The region R3 is located below the region R4. In the example illustrated in FIG. 3B, the region R3 and the region R4 are configured to divide the phase pattern P22 vertically into two halves. The boundary between the region R3 and region R4 extends along the X-axis direction.

The sub-patterns PS3 and PS4 are arranged in the up-down direction. The sub-patterns PS3 and PS4 are configured to form the focused light spots F3 and F4 at different positions. The sub-pattern PS3 is configured to form the focused light spot F3. The sub-pattern PS4 is configured to form the focused light spot F4. As illustrated in FIG. 4B, the phase pattern P22 is configured to have the focused light spots F3 and F4 arranged in the up-down direction.

The image transfer unit 4 adjusts the position where an image is formed by the light L emitted from the spatial light modulation unit 3. The image transfer unit 4 includes, for example, lenses 14 and 15. In one example, the light L emitted from the spatial light modulation unit 3 is incident on the lens 14 and then on the lens 15. The lenses 14 and 15 are arranged so that the focal point of the lens 14 and the focal point of the lens 15 are located between the lenses 14 and 15.

The processing unit 5 irradiates the workpiece S with the light L modulated in the spatial light modulation unit 3 to process the workpiece S. The processing unit 5 includes, for example, a mirror 16 and a lens 17. The light L emitted from the spatial light modulation unit 3 is incident on the mirror 16 via the image transfer unit 4. The mirror 16 guides the light L emitted from the spatial light modulation unit 3 to the lens 17. The mirror 16 is, for example, a half mirror. In one example, the mirror 16 separates the light L emitted from the image transfer unit 4 into reflected light and transmitted light. In the example illustrated in FIG. 1, the mirror 16 guides the reflected light to the lens 17 and the transmitted light to the monitor unit 6 and the detection unit 7. The lens 17 focuses the light L guided from the mirror 16 onto the processing surface SP of the workpiece S. The workpiece S is placed at a predetermined position.

The monitor unit 6 monitors the phase pattern P1 displayed on the spatial light modulation unit 3. In one example, the monitor unit 6 acquires an image of the phase pattern P1 displayed on the spatial light modulation unit 3. In one example, the monitor unit 6 includes a mirror 18 and an image-capture device 19. In one example, the light L emitted from the spatial light modulation unit 3 is incident on the mirror 18 via the image transfer unit 4 and the mirror 16. The mirror 18 guides the light L emitted from the spatial light modulation unit 3 to the image-capture device 19. The mirror 18 is, for example, a half mirror. In one example, the mirror 18 separates the light L emitted from the spatial light modulation unit 3 into reflected light and transmitted light. In the example illustrated in FIG. 1, the mirror 18 guides the reflected light to the image-capture device 19 and guides the transmitted light to the detection unit 7.

The image-capture device 19 captures an image formed by the light L guided from the mirror 18. The image captured by the image-capture device 19 is an NFP. The image captured by the image-capture device 19 is displayed, for example, on a display unit (not illustrated). In this case, the phase pattern P1 displayed on the spatial light modulation unit 3 can be directly observed from the image captured by the image-capture device 19. The observation of the image captured by the image-capture device 19 is acceptable to be performed by a user, or it may be mechanically processed by an arithmetic-operating device 30 or the like, which will be described later. Such configuration enables the monitor unit 6 to check whether a desired phase pattern is displayed on the spatial light modulation unit 3. In one example, monitoring by the monitor unit 6 makes it possible for the control unit 9 to implement feedback control of the phase pattern P1 displayed on the spatial light modulation unit 3.

The detection unit 7 detects the light L modulated in the spatial light modulation unit 3. The detection unit 7 detects intensity information of the incident light L. The detection unit 7 detects the intensity information of the focused light spot formed by the phase pattern P1 displayed on the spatial light modulation unit 3. For example, the detection unit 7 includes a lens 21 and an intensity detection unit 22. For example, the light L emitted from the spatial light modulation unit 3 is incident on the lens 21 via the image transfer unit 4 and the mirrors 16 and 18. The lens 21 guides the light L emitted from the spatial light modulation unit 3 to the intensity detection unit 22. The lens 21 forms a focused light spot by focusing the light L emitted from the spatial light modulation unit 3. Herein, as illustrated in FIG. 1, the X-axis direction corresponds to the horizontal direction, the Y-axis direction corresponds to the incident direction of the light L to the intensity detection unit 22, and the Z-axis direction corresponds to the vertical direction.

The intensity detection unit 22 detects the intensity information of the focused light spot formed by the lens 21. The intensity detection unit 22 measures the intensity of the focused light spot as the intensity information of the focused light spot. The intensity detection unit 22 detects the multiple focused light spots formed by the phase pattern P20. The intensity detection unit 22 is acceptable to further detect the positions at which the focused light spots are formed.

In the present embodiment, the intensity detection unit 22 is, for example, an image-capture device. The intensity detection unit 22 acquires an image of the focused light spots formed in the image-capture region. The image-capture region corresponds to an image-capture surface of image sensor elements. The image-capture surface is constituted by multiple pixels arranged two-dimensionally in a matrix. The captured image is formed by information acquired from each of the multiple pixels that constitute the image-capture surface. The captured image being acquired includes intensity information of the focused light spots and position information of the focused light spots. The image captured by the intensity detection unit 22 is an FFP.

As a modification of the present embodiment, the intensity detection unit 22 is acceptable to be a device that measures light intensity other than an image-capture device, or it may be multiple optical power meters that are spaced apart from each other. For example, the multiple optical power meters may be multiple photodiodes that are spaced apart from each other. In the present modification, the multiple optical power meters are arranged to correspond to the positions where the multiple focused light spots formed by the phase pattern P20 are formed. For example, the optical power meters are arranged in a one-to-one relationship at the positions where the multiple focused light spots are formed.

The control unit 9 controls the spatial light modulation unit 3 and estimates the incident position P2 of the light L onto the spatial light modulation unit 3. The control unit 9 is further acceptable to control the optical axis adjustment unit 2. The control unit 9 includes the arithmetic-operating device 30. The arithmetic-operating device 30 includes one or more computers configured with these hardware components and software, such as programs. In the case where the arithmetic-operating device 30 is configured with multiple computers, these computers are acceptable to be connected locally, or they may be connected via a communication network such as the Internet or an intranet.

The control unit 9 is configured, for example, with the arithmetic-operating device 30. The arithmetic-operating device 30 includes, for example, a processor, a main storage device, an auxiliary storage device, a communication device, an input device, an output device, and a display device. The arithmetic-operating device 30 may include a cloud. The processor executes an operating system and application programs. The main storage device is constituted by read-only memory (ROM) and random-access memory (RAM). The auxiliary storage device is a storage medium constituted by a hard disk and a flash memory. The communication device is constituted by a network card or a wireless communication module. The input device is constituted by a keyboard, a mouse, a touch panel, and the like. The output device is constituted by a display, a printer, and the like.

In the present embodiment, the control unit 9 executes a processing process for processing the workpiece S and a position estimation process for estimating the incident position P2 of the light L onto the spatial light modulation unit 3. In the processing process, the phase pattern P10 used for processing is employed. In the position estimation process, the phase pattern P20 used for incident position estimation is employed. For example, the position estimation process is executed before the processing process is executed. This allows adjustment of the positional relationship between the phase pattern P10 in the processing process and the incident position P2 of the light L on the phase pattern P10. This adjustment of the positional relationship enables the light L to be incident on a desired position of the phase pattern P10 in the processing process. The position estimation process is acceptable to be executed during the processing process.

As a modification of the present embodiment, it is permissible for the time during which the position estimation process is executed to overlap with the time during which the processing process is executed. In this case, the phase pattern used for processing P10 may also serve as the phase pattern P20 used for incident position estimation. In this case, the light L modulated by the phase pattern P10 is used for processing the workpiece S in the processing unit 5, and simultaneously used for the incident position estimation P2 of the light L onto the spatial light modulation unit 3 by the detection unit 7 and the control unit 9.

In the present embodiment, the control unit 9 includes a pattern setting unit 31, an information acquisition unit 32, a comparison unit 33, a position adjustment unit 34, and an estimation unit 35. In the case where the arithmetic-operating device 30 is constituted by multiple computers, the pattern setting unit 31, the information acquisition unit 32, the comparison unit 33, the position adjustment unit 34, and the estimation unit 35 are each logically constructed through the connection of these computers. In the present embodiment, the single arithmetic-operating device 30 constitutes the pattern setting unit 31, the information acquisition unit 32, the comparison unit 33, the position adjustment unit 34, and the estimation unit 35. As a modification of the present embodiment, the pattern setting unit 31, the information acquisition unit 32, the comparison unit 33, the position adjustment unit 34, and the estimation unit 35 are acceptable to be configured by a plurality of operation devices 30 that is spatially separated from each other.

The pattern setting unit 31 controls the phase pattern P1. The pattern setting unit 31 sets the phase pattern P1 to be displayed on the spatial light modulation unit 3. The pattern setting unit 31 generates, for example, the phase pattern P1 to be set on the spatial light modulation unit 3.

As a modification of the present embodiment, the pattern setting unit 31 may acquire the phase pattern P1 generated outside the processing device 1. The pattern setting unit 31 may store at least one of the phase pattern P1 generated externally to the processing device 1 and the phase pattern P1 generated beforehand by the pattern setting unit 31. In this case, the pattern setting unit 31 may set the pre-stored phase pattern P1 to the spatial light modulation unit 3.

The pattern setting unit 31 sets at least one of the phase pattern P10 used for processing and the phase pattern P20 used for the incident position estimation as the phase pattern P1 to be displayed on the spatial light modulation unit 3. In the present embodiment, the phase pattern P1 set by the pattern setting unit 31 includes both the phase pattern P10 and the phase pattern P20. In the present embodiment, the pattern setting unit 31 sets the phase patterns P21 and P22, which have different types of configurations, used for incident position estimation.

For example, the pattern setting unit 31 sets the phase pattern P10 on the spatial light modulation unit 3 in the processing process. The phase pattern P10 forms the light L that is applied to the workpiece S during the processing process. As a result, the spatial light modulation unit 3 displays the phase pattern P10 used for processing in the processing process, modulates the light L incident on the phase pattern P10, and emits the light L that is applied to the workpiece S during the processing. For example, the light L modulated by the phase pattern P10 is focused by the lens 17 of the processing unit 5 and applied onto the processing surface SP of the workpiece S.

For example, the pattern setting unit 31 sets the phase pattern P20 on the spatial light modulation unit 3 in the position estimation process. The phase pattern P20 forms the light L used to estimate the incident position P2 in the position estimation process. As a result, the spatial light modulation unit 3 displays the phase pattern P20 used for incident position estimation in the position estimation process, modulates the light L incident on the phase pattern P20, and emits the light L used to estimate the incident position P2. The light L modulated by the phase pattern P20 is focused by the lens 21 of the detection unit 7 and forms multiple focused light spots on the intensity detection unit 22.

The information acquisition unit 32 acquires results obtained by the detection from the intensity detection unit 22. The information acquisition unit 32 acquires intensity information of each of the multiple focused light spots on the basis of the detection result acquired from the intensity detection unit 22. In the present embodiment, the information acquisition unit 32 further acquires position information of each of the multiple focused light spots on the basis of the detection result acquired from the intensity detection unit 22. The information acquisition unit 32 determines the position of the focused light spot formed by the phase pattern P20, for example, on the basis of the detection result in the intensity detection unit 22. The information acquisition unit 32 associates the intensity information of the focused light spot with the position of the focused light spot, for example, for each focused light spot individually.

In the case where the intensity detection unit 22 detects not only the intensity information of the focused light spot but also the position of the focused light spot, the information acquisition unit 32 acquires the intensity information and position of the focused light spot detected by the intensity detection unit 22. In the present embodiment, the intensity detection unit 22 captures an image of the focused light spot. In this case, for example, the information acquisition unit 32 acquires the intensity information of the focused light spot on the basis of the luminance of the pixel in the captured image and acquires the position information of the focused light spot on the basis of the pixel position in the captured image.

As a modification of the present embodiment, in the case where each of the multiple focused light spots is detected by multiple intensity detection units 22, the information acquisition unit 32 acquires the position of the focused light spot on the basis of the type of the intensity detection unit 22 that detected the focused light spot. The type of the intensity detection unit 22 may be, for example, the individual number of the intensity detection unit 22 or the position of each intensity detection unit 22.

The information acquisition unit 32 acquires input information and output information to and from the control unit 9, as well as the results obtained by operation in the control unit 9. The information acquisition unit 32 stores the acquired information in the auxiliary storage device.

The comparison unit 33 compares the intensity information of the multiple focused light spots with each other on the basis of the information acquired by the information acquisition unit 32. The comparison unit 33, for example, compares the intensity information of the multiple focused light spots included in one captured image captured by the intensity detection unit 22. The comparison unit 33, for example, determines whether the intensities of the multiple focused light spots are equal to each other. The comparison unit 33 arithmetically operates, for example, the intensity ratio of two focused light spots formed by the phase pattern P20.

The phrase, "intensities of the multiple focused light spots are equal to each other", means that, for every combination of two selected focused light spots from the multiple focused light spots, the intensity ratio of the two focused light spots falls within a predetermined range based on a value of 1. The predetermined range depends on, for example, the significant digits of the intensity detected by the intensity detection unit 22. The predetermined range is, for example, 0.99 or more and 1.01 or less. In the case where the intensity of the focused light spots is measured multiple times using the same phase pattern P20, the intensity ratio described above is arithmetically operated on the basis of the average, maximum, median, or mode of the intensities measured multiple times.

In one example, the comparison unit 33 may determine whether the incident position P2 relative to the phase pattern P20 is appropriate on the basis of the intensity information of the focused light spots. In one example, in the case where the comparison unit 33 determines that the incident position P2 relative to the phase pattern P20 is not appropriate, the position adjustment unit 34 adjusts the positional relationship between the phase pattern P20 and the incident light on the phase pattern P20. In one example, in the case where the comparison unit 33 determines that the incident position P2 relative to the phase pattern P20 is appropriate, the information acquisition unit 32 stores information regarding the current configuration of the phase pattern P20. The stored information is used to set the phase pattern P10 used for processing in the processing process.

As a modification of the present embodiment, in the case where the comparison unit 33 determines that the incident position P2 relative to the phase pattern P20 is appropriate, the information acquisition unit 32 may store information regarding the current setting of the optical axis adjustment unit 2. The stored information is used to set the optical axis adjustment unit 2 in the processing process. As a further modification, in the case where the comparison unit 33 determines that the incident position P2 relative to the phase pattern P20 is appropriate, the position adjustment unit 34 may maintain the current setting of the optical axis adjustment unit 2 until the processing process.

The position adjustment unit 34 adjusts the positional relationship between the phase pattern P1 and the incident light on the phase pattern P1. In adjusting the positional relationship between the phase pattern P20 and the incident light on the phase pattern P1, the position adjustment unit 34 executes at least one of the following: changing the phase pattern P1 displayed on the spatial light modulation unit 3 and changing the optical axis position of the incident light on the phase pattern P1.

Figure 5:
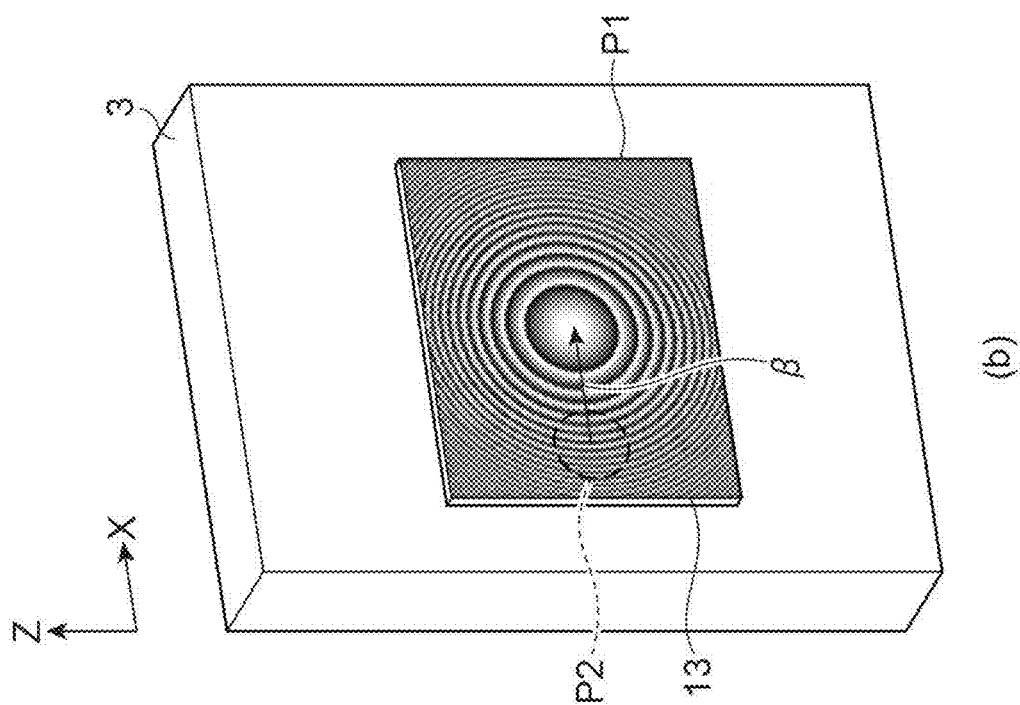
FIGS. 5A and 5B are diagrams illustrated to describe an example of changing the positional relationship between a phase pattern and the incident light on the phase pattern.
Figure 5:
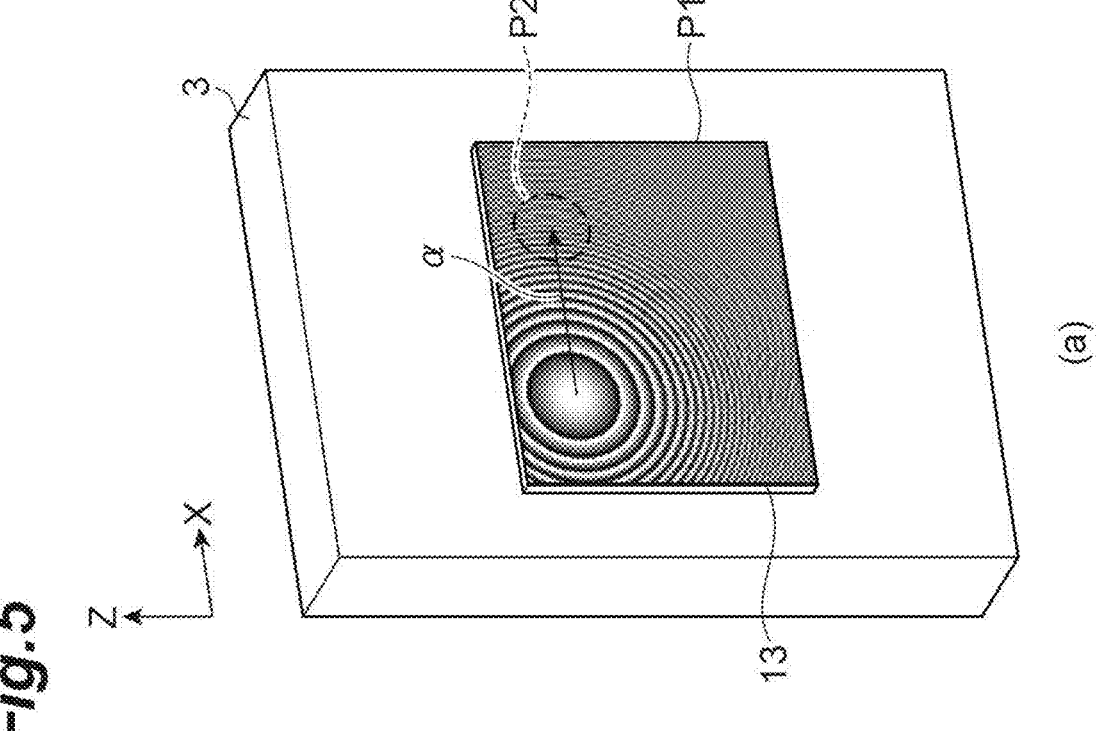

The position adjustment unit 34, for example, changes the phase pattern P1 so that the configuration of the phase pattern P1 shifts in the direction of the arrow α with respect to the spatial light modulation unit 3, as illustrated in FIG. 5A. This changes the positional relationship between the phase pattern P1 and the incident light on the phase pattern P1. The position adjustment unit 34 changes the position of the optical axis of the incident light, for example, so that the incident position P2 of the incident light on the phase pattern P1 moves in the direction of the arrow β, as illustrated in FIG. 5B. This also changes the positional relationship between the phase pattern P1 and the incident light on the phase pattern P1. FIGS. 5A and 5B are diagrams illustrated to describe an example of changing the positional relationship between the phase pattern P1 and the incident light on the phase pattern P1.

In the present embodiment, in adjusting the positional relationship between the phase pattern P1 and the incident light on the phase pattern P1, the position adjustment unit 34 instructs the pattern setting unit 31 to reset the phase pattern P1, and it changes the phase pattern P1 displayed on the spatial light modulation unit 3. As a modification of the present embodiment, in adjusting the positional relationship between the phase pattern P1 and the incident light on the phase pattern P1, the position adjustment unit 34 may control the optical axis adjustment unit 2 to adjust the optical axis position of the incident light onto the spatial light modulation unit 3.

In one example, the position adjustment unit 34 adjusts the positional relationship between the phase pattern P1 and the incident light on the phase pattern P1 to a preset positional relationship. For example, the position adjustment unit 34 adjusts the positional relationship between the phase pattern P1 and the incident light on the phase pattern P1 on the basis of the detection result from the intensity detection unit 22.

In one example, the position adjustment unit 34 adjusts the positional relationship between the phase pattern P10 and the incident light on the phase pattern used for processing P10 on the basis of the estimation result from the estimation unit 35. For example, the position adjustment unit 34 executes at least one of the following: changing the phase pattern P10 displayed on the spatial light modulation unit 3 and changing the optical axis position of the incident light on the phase pattern P10, and it causes the light L to be incident on the phase pattern P10 at the incident position P2 estimated by the estimation unit 35.

In one example, the position adjustment unit 34 adjusts the positional relationship between the phase pattern P20 and the incident light on the phase pattern P20 used for incident position estimation on the basis of the detection result of the intensity detection unit 22 acquired by the information acquisition unit 32. For example, the position adjustment unit 34 executes at least one of the following: changing the phase pattern P20 displayed on the spatial light modulation unit 3 and changing the optical axis position of the incident light on the phase pattern P20 and makes the light L incident on the phase pattern P20.

In one example, the position adjustment unit 34 adjusts the positional relationship between the phase pattern P20 and the incident light on the phase pattern P20 on the basis of the intensity information of the focused light spot. The position adjustment unit 34 adjusts the positional relationship between the phase pattern P20 and the incident light on the phase pattern P20 on the basis of the intensity information of the focused light spot and the position information of the focused light spot.

The position adjustment unit 34 adjusts the positional relationship between the phase pattern P20 and the incident light on the phase pattern P20 to ensure that the intensity information of multiple focused light spots is detected by the intensity detection unit 22. In the case where the intensity detection unit 22 detects the intensity information of only one focused light spot, the position adjustment unit 34 adjusts the positional relationship between the phase pattern P20 and the incident light on the phase pattern P20 to ensure that the intensity information of multiple focused light spots is detected by the intensity detection unit 22.

In the present embodiment, the position adjustment unit 34 changes the phase pattern P20 displayed on the spatial light modulation unit 3 in stages as a change in the positional relationship between the phase pattern P20 and the incident light on the phase pattern P20 in the position estimation process. In the present embodiment, the position adjustment unit 34 adjusts the positional relationship between the phase pattern P20 and the incident light on the phase pattern P20 in stages until the intensity information of the focused light spots is obtained for all of the preset phase patterns P20.

As a modification of the present embodiment, the position adjustment unit 34 may adjust the positional relationship between the phase pattern P20 and the incident light on the phase pattern P20 in stages on the basis of the comparison result of the intensity information from the multiple focused light spots. For example, the position adjustment unit 34 may adjust the positional relationship between the phase pattern P20 and the incident light on the phase pattern P20 in stages until the intensities of at least two of the multiple focused light spots become equal to each other.

As a further modification of the present embodiment, the position adjustment unit 34 may adjust the positional relationship between the phase pattern P20 and the incident light on the phase pattern P20 so that the intensity ratio of a pair of focused light spots among the multiple focused light spots approaches a value of 1. In other words, the position adjustment unit 34 may adjust the positional relationship between the phase pattern P20 and the incident light on the phase pattern P20 so that the intensities of a pair of focused light spots among the multiple focused light spots become equal to each other. For example, the position adjustment unit 34 may adjust the positional relationship between the phase pattern P20 and the incident light on the phase pattern P20 on the basis of the detection result in the intensity detection unit 22 so that the value of the intensity ratio of the multiple focused light spots is 0.99 or more and 1.01 or less. In the present modification, the position adjustment unit 34 may adjust the positional relationship between the phase pattern P20 and the incident light on the phase pattern P20 using a method such as the bisection method, where it divides the position intervals in the spatial light modulation unit 3 and uses the intensity ratio as the criterion.

In the present embodiment, in adjusting the positional relationship between the phase pattern P20 and the incident light on the phase pattern P20, the position adjustment unit 34 instructs the pattern setting unit 31 to reset the phase pattern P20 and changes the phase pattern P20 displayed on the spatial light modulation unit 3. For example, in the case where the pattern setting unit 31 is instructed by the position adjustment unit 34 to reset the phase pattern P21, the pattern setting unit 31 causes the spatial light modulation unit 3 to display a phase pattern P21 having a different arrangement configuration of the sub-patterns PS1 and PS2. In other words, in the case where the pattern setting unit 31 is instructed by the position adjustment unit 34 to reset the phase pattern P21, the pattern setting unit 31 changes the arrangement of the sub-patterns PS1 and PS2 in the phase pattern P21 to be displayed on the spatial light modulation unit 3. As a modification of the present embodiment, the position adjustment unit 34 may control the optical axis adjustment unit 2 to adjust the optical axis position of the light incident on the spatial light modulation unit 3 in adjusting the positional relationship between the phase pattern P20 and the incident light on the phase pattern P20.

The estimation unit 35 estimates the incident position P2 of the light L onto the spatial light modulation unit 3 on the basis of the detection result from the intensity detection unit 22. In other words, the estimation unit 35 estimates the incident position P2 of the light L onto the spatial light modulation unit 3 on the basis of the comparison result of the intensity information detected by the intensity detection unit 22. For example, the estimation unit 35 estimates the incident position P2 of the light L onto the spatial light modulation unit 3 on the basis of the comparison result of the intensity information of the focused light spots formed by each of the plurality of the phase patterns P20 with different configurations.

Specifically, the estimation unit 35 estimates the incident position P2 of the light L onto the spatial light modulation unit 3, for example, on the basis of the positional relationship between the incident light on the phase pattern P20 adjusted by the position adjustment unit 34 and the phase pattern P20 and the comparison result of the intensity information of the focused light spot formed by the phase pattern P20. For example, the estimation unit 35 estimates the incident position P2 of the light L onto the spatial light modulation unit 3 on the basis of the positional relationship between the phase pattern P20 and the incident light on the phase pattern P20. The positional relationship used to estimate the incident position P2 is a positional relationship where the intensities of at least two of the multiple focused light spots are equal to each other.

For example, the estimation unit 35 estimates the incident position P2 of the light L onto the spatial light modulation unit 3 on the basis of the configuration of the phase pattern P20 in which the intensities of at least two of the multiple focused light spots are equal to each other. For example, in a phase pattern P21 in which at least two of the multiple focused light spots have the same intensity, the estimation unit 35 estimates the position of the boundary between the sub-pattern PS1 and the sub-pattern PS2 as the incident position P2 of the light L onto the spatial light modulation unit 3. Similarly, in the phase pattern P22 where at least two of the multiple focused light spots have the same intensity, the estimation unit 35 estimates the position of the boundary between the sub-pattern PS3 and the sub-pattern PS4 as the incident position P2 of the light L onto the spatial light modulation unit 3.

The estimation unit 35 estimates the incident position P2 of the light L onto the spatial light modulation unit 3 on the basis of the comparison result of the intensity information of the pair of focused light spots F1 and F2 and the comparison result of the intensity information of the pair of focused light spots F3 and F4. The pair of focused light spots F1 and F2 are formed by the light L incident on the pair of regions R1 and R2, respectively. The pair of regions R1 and R2 are mutually adjacent in the X-axis direction in the phase pattern P21. The pair of focused light spots F3 and F4 are formed by the light L incident on the pair of regions R3 and R4, respectively. The pair of regions R3 and R4 are mutually adjacent in the Z-axis direction in the phase pattern P22. For example, in the case where the X-axis direction corresponds to the first direction, the Z-axis direction corresponds to the second direction.

As a modification of the present embodiment, the estimation unit 35 may arithmetically operate the incident position P2 of the light L onto the spatial light modulation unit 3 on the basis of the comparison result of the intensity information of the multiple focused light spots. For example, the estimation unit 35 may arithmetically operate the incident position P2 of the light L onto the spatial light modulation unit 3 on the basis of the intensity ratio of the multiple focused light spots. The estimation unit 35 may arithmetically operate the misalignment amount of the incident position P2 with respect to the spatial light modulation unit 3 in the processing process on the basis of the change in the intensity ratio of the multiple focused light spots. The position adjustment unit 34 may adjust the positional relationship between the incident light on the phase pattern P10 and the phase pattern P10 so that the misalignment is corrected on the basis of the misalignment amount of the incident position P2 arithmetically operated by the estimation unit 35.

With reference to FIGS. 6A to 6E, the change in the positional relationship between the phase pattern P20 and the incident light on the phase pattern P20 in the position estimation process is now described in detail. FIGS. 6A to 6E are diagrams illustrating the relationship between the phase pattern P20 used for incident position estimation and the focused light spots F1 and F2. In the present embodiment, the position adjustment unit 34 changes the phase pattern P20 displayed on the spatial light modulation unit 3 in stages as a change in the positional relationship between the phase pattern P20 and the incident light on the phase pattern P20 in the position estimation process.

In the position estimation process, the processing device 1 uses, for example, the plurality of phase patterns P21 used for incident position estimation as the phase pattern P20. In this case, the pattern setting unit 31 sets the plurality of phase patterns P21 in the spatial light modulation unit 3. For example, the position adjustment unit 34 causes the spatial light modulation unit 3 to sequentially display the plurality of phase patterns P21. The intensity detection unit 22 sequentially detects the focused light spots F1 and F2 formed by the respective phase patterns P21. In other words, in the position estimation process, the processing device 1 repeats the change of the phase pattern P21 by the position adjustment unit 34 and the detection of the focused light spots formed by the phase pattern P21 by the intensity detection unit 22.

The intensity detection unit 22 further detects the intensity information of the multiple focused light spots F1 and F2 after the positional relationship between the phase pattern P21 and the incident light on the phase pattern P21 is adjusted by the position adjustment unit 34. The estimation unit 35 estimates the incident position P2 of the light L onto the spatial light modulation unit 3 on the basis of the comparison result of the intensity information of the multiple focused light spots F1 and F2 detected after the adjustment of the positional relationship between the phase pattern P21 and the incident light on the phase pattern P21. By combining the change of the phase pattern P21 and the detection of the focused light spots, position search processing used to search for the incident position P2 of the light L in the phase pattern P21 is executed.

FIGS. 6A to 6E illustrate the relationship between the phase pattern P20 used for the incident position estimation and the focused light spots F1 and F2 in an example in which the phase pattern P20 displayed on the spatial light modulation unit 3 is changed in the position estimation process. In the present embodiment, the position adjustment unit 34 adjusts the positional relationship between the phase pattern P20 and the incident light on the phase pattern P20 in stages from the state illustrated in FIG. 6A to the state illustrated in FIG. 6E. In other words, the position adjustment unit 34 causes the spatial light modulation unit 3 to sequentially display the plurality of the phase patterns P21 illustrated in FIGS. 6A to 6E.

The respective phase patterns P21 include multiple types of sub-patterns PS1 and PS2. The arrangement configurations of the sub-patterns PS1 and PS2 in the phase pattern P21 differ for the respective phase patterns P21. The light L is incident on each of the phase patterns P21 illustrated in FIGS. 6A to 6E. The light L is modulated by the phase pattern P21 and is emitted toward the detection unit 7.

In the phase pattern P21 illustrated in FIGS. 6A to 6E, the sub-patterns PS1 and PS2 are arranged in the X-axis direction. In the plurality of the phase patterns P21 illustrated in FIGS. 6A to 6E, the region ratio of the region R1 where the sub-pattern PS1 is located to the region R2 where the sub-pattern PS2 is located differs for the respective phase patterns P21. In the plurality of the phase patterns P21 illustrated in FIGS. 6A to 6E, the length ratio of the region R1 to the region R2 in the X-axis direction differs for the respective phase patterns P21. In the plurality of the phase patterns P21 illustrated in FIGS. 6A to 6E, the position of the boundary between the region R1 and the region R2 differs for the respective phase patterns P21. In the plurality of the phase patterns P21 illustrated in FIGS. 6A to 6E, the position where the light L is incident remains the same.

The sub-pattern PS1 modulates the light L1 incident on the sub-pattern PS1 out of the light L and forms the focused light spot F1 in the intensity detection unit 22. The sub-pattern PS2 modulates light L2 that is incident on the sub-pattern PS2 out of the light L and forms a focused light spot F2 in the intensity detection unit 22. The intensity detection unit 22 captures the image M1 in which the focused light spot formed on the intensity detection unit 22 is displayed.

Figure 6:
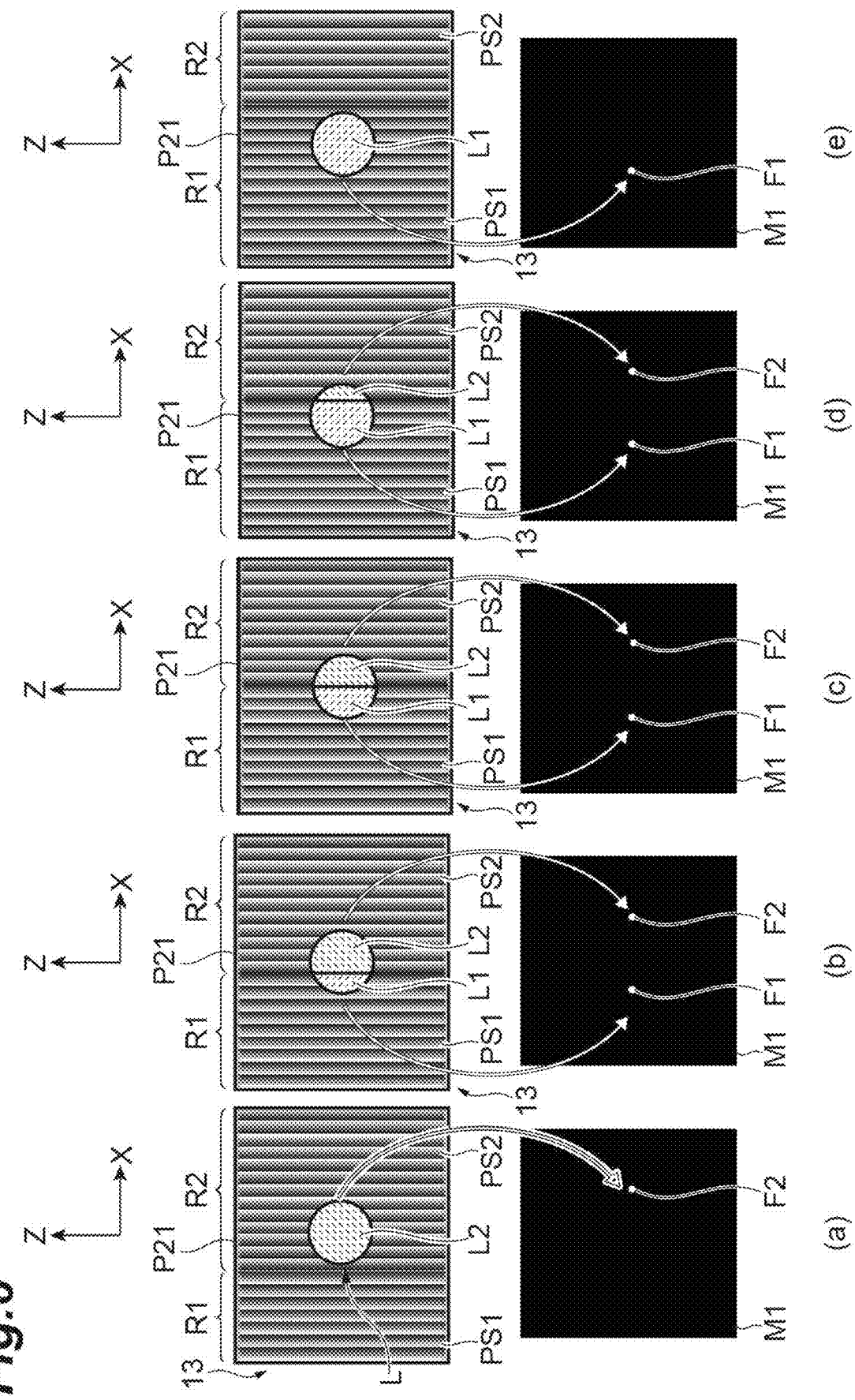
FIG. 6A to FIG. 6E are diagrams illustrating the relationship between a phase pattern used for an incident position estimation and a focused light spot.

In the phase pattern P21 illustrated in FIG. 6A, the length of the region R2 in the X-axis direction is greater than the length of the region R1 in the X-axis direction. In FIG. 6A, the light L is incident only on the sub-pattern PS2 of the phase pattern P21. Thus, the focused light spot F1 is not formed in the intensity detection unit 22, and only the focused light spot F2 is formed in the intensity detection unit 22. As a result, only the focused light spot F2 is displayed on the image M1.

In the phase pattern P21 illustrated in FIG. 6B, the length of the region R2 in the X-axis direction is greater than length of the region R1 in the X-axis direction. In the X-axis direction, the length of the region R2 in FIG. 6B is smaller than the length of the region R2 in FIG. 6A, and the length of the region R1 in FIG. 6B is greater than the length of the region R1 illustrated in FIG. 6A. In FIG. 6B, the light L is incident on the sub-patterns PS1 and PS2. As a result, the focused light spots F1 and F2 are displayed in the image M1. In the phase pattern P21, the region of the light L2 is greater than the region of the light L1. Thus, the intensity of the focused light spot F2 is greater than the intensity of the focused light spot F1.

In the phase pattern P21 illustrated in FIG. 6C, the length of the region R2 in the X-axis direction is equal to the length of the region R1 in the X-axis direction. In FIG. 6C, the light L is incident on the sub-patterns PS1 and PS2. As a result, the focused light spots F1 and F2 are displayed in the image M1. In the phase pattern P21, the region of the light L2 is equal to the region of the light L1. Thus, the intensity of the focused light spot F2 is equal to the intensity of the focused light spot F1.

In the phase pattern P21 illustrated in FIG. 6D, the length of the region R2 in the X-axis direction is smaller than the length of the region R1 in the X-axis direction. In FIG. 6D, the light L is incident on the sub-patterns PS1 and PS2. As a result, the focused light spots F1 and F2 are displayed in the image M1. In the phase pattern P21, the region of the light L2 is smaller than the region of the light L1. Thus, the intensity of the focused light spot F2 is smaller than the intensity of the focused light spot F1.

In the phase pattern P21 illustrated in FIG. 6E, the length of the region R2 in the X-axis direction is smaller than the length of the region R1 in the X-axis direction. In the X-axis direction, the length of the region R2 in FIG. 6E is smaller than the length of the region R2 illustrated in FIG. 6D, and the length of the region R1 in FIG. 6E is greater than the length of the region R1 illustrated in FIG. 6D. In FIG. 6E, the light L is incident only on the sub-pattern PS1 of the phase pattern P21. Thus, the focused light spot F2 is not formed in the intensity detection unit 22, and only the focused light spot F1 is formed in the intensity detection unit 22. As a result, only the focused light spot F1 is displayed in the image M1.

The phase pattern P21 illustrated in FIGS. 6A to 6E detects the intensity information of the different focused light spots F1 and F2. The intensity ratio of the focused light spots F1 and F2 approaches the value of 1 most in the phase pattern P21 illustrated in FIG. 6C. Thus, the estimation unit 35 estimates that the light L is incident at a position corresponding to the phase pattern P21 illustrated in FIG. 6C. In this way, the incident position P2 of the light L onto the spatial light modulation unit 3 is estimated. For example, the position of the boundary between the sub-pattern PS1 and the sub-pattern PS2 of the phase pattern P21 illustrated in FIG. 6C is estimated as the incident position P2 of the light L onto the spatial light modulation unit 3 in the X-axis direction. In other words, the position of the boundary between the region R1 and the region R2 is estimated as the incident position P2 of the light L onto the spatial light modulation unit 3 in the X-axis direction.

The description mentioned above is given for an example in which the change in the positional relationship between the phase pattern P20 and the incident light on the phase pattern P20 in the position estimation process is performed by changing the phase pattern P20 displayed on the spatial light modulation unit 3. This change in the positional relationship may also be achieved by a similar process of changing the optical axis position of the light incident on the phase pattern P20.

For example, in the case where the optical axis position of the light incident on the phase pattern P20 is changed, the position adjustment unit 34 sequentially changes the incident position P2 of the light incident on the phase pattern P21 by changing the optical axis position. The intensity detection unit 22 sequentially detects the focused light spots formed by the incident light with different incident positions P2. In other words, in the position estimation process, the processing device 1 repeats the change in the optical axis position of the light incident on the phase pattern P1 by the position adjustment unit 34 and the detection of the focused light spots formed by the phase pattern P21 by the intensity detection unit 22. In this case, as well, the intensity detection unit 22 detects the intensity information of the multiple focused light spots after the positional relationship between the phase pattern P21 and the light incident on the phase pattern P21 is adjusted by the position adjustment unit 34. In this way, the position search processing used to search for the incident position P2 of the light L in the phase pattern P21 may be executed by combining the change in the optical axis position and the detection of the focused light spot.

Figure 7:
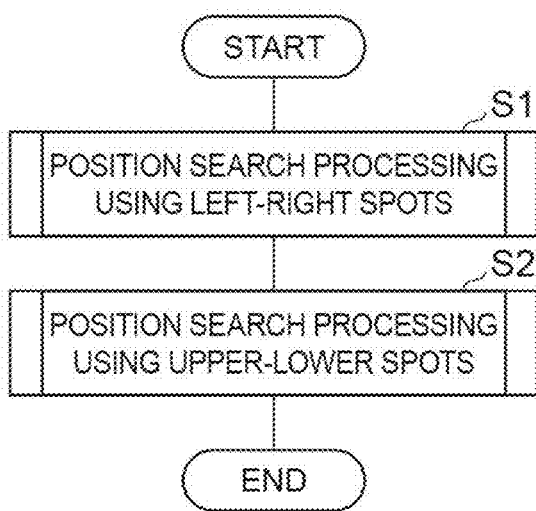
FIG. 7 is a flowchart illustrated to describe a position estimation process.
Figure 8:
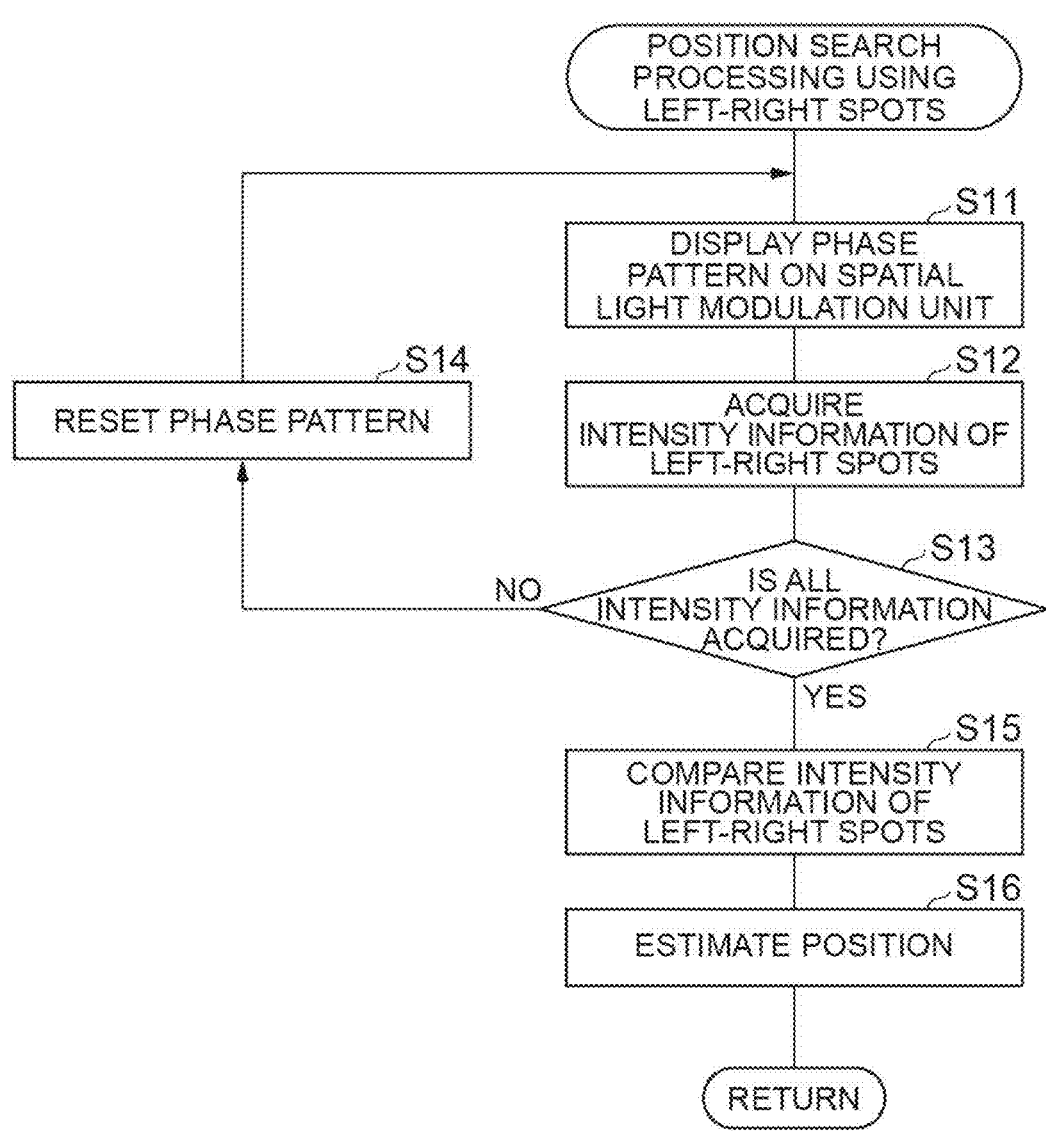
FIG. 8 is a flowchart illustrated to describe the position estimation process.
Figure 9:
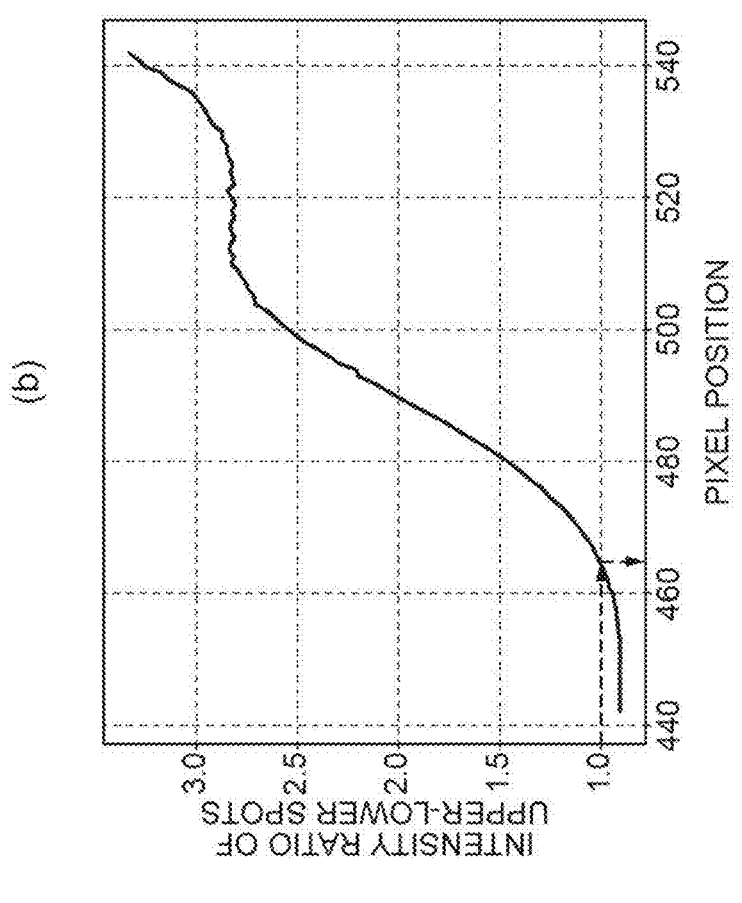
FIGS. 9A and 9B are graphs plotting results obtained by comparing pieces of intensity information of focused light spots for respective phase patterns used for the incident position estimation.
Figure 9:
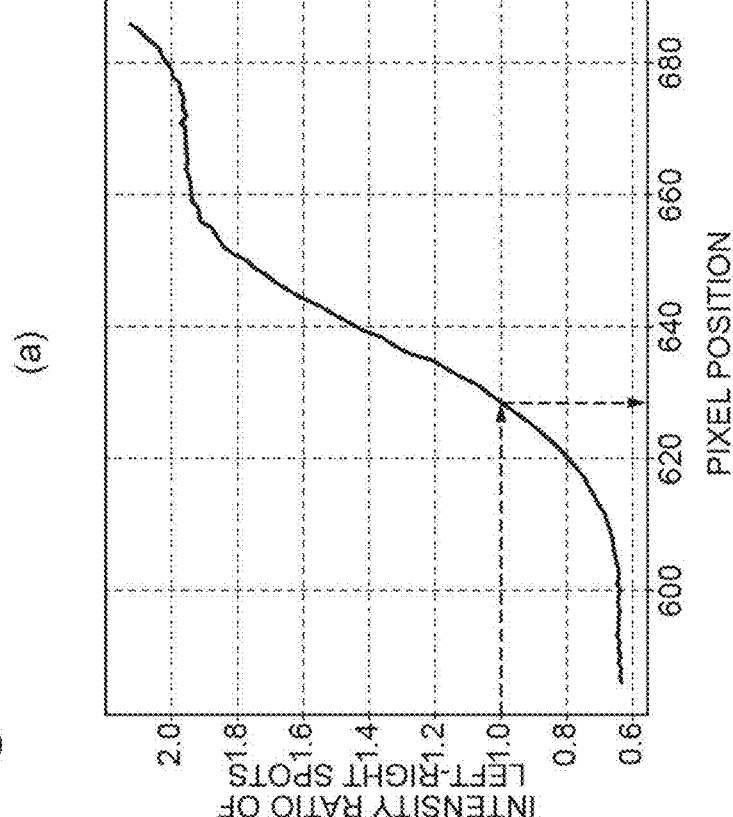

With reference to FIGS. 7, 8, 9A, and 9B, an example of a position estimation method performed by the spatial light modulation device 10 is now described. FIGS. 7 and 8 are flowcharts illustrated to describe the position estimation process. FIGS. 9A and 9B are graphs illustrating the values of the intensity ratio of a plurality of focused light spots.

In the position estimation process, the control unit 9 executes the position search processing using the pattern setting unit 31, the information acquisition unit 32, the comparison unit 33, the position adjustment unit 34, and the estimation unit 35. The position estimation process is executed, for example, according to the flowchart illustrated in FIG. 7.

The control unit 9 first executes the position search processing using the left-right spots (processing step S1). The control unit 9 executes the position search processing using the left-right spots. The left-right spots correspond to the focused light spots F1 and F2 arranged in the X-axis direction, as illustrated in FIG. 3B. In the processing step S1, the phase pattern P21 used for the incident position estimation, in which the sub-patterns PS1 and PS2 are arranged in the left-right direction, as illustrated in FIG. 3A, is used. In the processing step S1, the pattern setting unit 31 sets the phase pattern P21 in the spatial light modulation unit 3. The estimation unit 35 estimates the incident position P2 of the light L onto the spatial light modulation unit 3 on the basis of the intensity information of the focused light spots F1 and F2 formed by the phase pattern P21.

Subsequently, the control unit 9 executes the position search processing using the upper-lower spots (processing step S2). The top-bottom-right spots correspond to the focused light spots F3 and F4 arranged in the Z-axis direction as illustrated in FIG. 4B. In the processing step S2, the phase pattern P22 used for the incident position estimation, in which the sub-patterns PS3 and PS4 are arranged in the up-down direction as illustrated in FIG. 4A, is used. In the processing step S2, the pattern setting unit 31 sets the phase pattern P22 in the spatial light modulation unit 3. The estimation unit 35 estimates the incident position P2 of the light L onto the spatial light modulation unit 3 on the basis of the intensity information of the focused light spots F3 and F4 formed by the phase pattern P22.

The incident position P2 in the left-right and up-down directions is estimated by the processing steps S1 and S2. The control unit 9 terminates the position estimation process upon the completion of the processing steps S1 and S2. As a modification of the present embodiment, the control unit 9 may execute the position search processing using left-right spots after the position search processing using upper-lower spots.

The position search processing using left-right spots is now described in detail with reference to FIG. 8. In this position search processing, the setting of the positional relationship between the incident light on the phase pattern P20 used for incident position estimation and the phase pattern P20 and the detection of the intensity information of the focused light spots are repeated until the intensity information is acquired for all of the plurality of the phase patterns P20. The following will exemplify a case in which the change in the positional relationship between the phase pattern P20 and the incident light on the phase pattern P20 is executed by changing the phase pattern P20 displayed on the spatial light modulation unit 3.

The phase pattern P20 used for the incident position estimation is first displayed on the spatial light modulation unit 3 (processing step S11). For example, the pattern setting unit 31 causes the spatial light modulation unit 3 to display the phase pattern P20. In the processing step S11 initially executed after the position search processing is executed, the pattern setting unit 31 sets the predetermined phase pattern P20 on the spatial light modulation unit 3 and causes the spatial light modulation unit 3 to display it. For example, the predetermined phase pattern P20 is the phase pattern P21 in which the length ratio of the region R2 to the region R1 in the X-axis direction is the largest. In other words, the predetermined phase pattern P20 is the phase pattern P21 in which the number of pixels in the region R2 in the X-axis direction is the largest. As a modification, the predetermined phase pattern P20 is acceptable to be the phase pattern P21 in which the number of pixels in the region R2 in the X-axis direction is the smallest. In the position search processing using left-right spots, the pattern setting unit 31 sets the phase pattern P21 on the spatial light modulation unit 3.

Subsequently, intensity information of the left-right spots is acquired (processing step S12). For example, in the processing step S11, the light L is incident on the phase pattern P21 displayed on the spatial light modulation unit 3, and multiple focused light spots F1 and F2 are formed in the intensity detection unit 22. The multiple focused light spots F1 and F2 formed in the intensity detection unit 22 are the left-right spots. For example, the intensity detection unit 22 detects the intensity information of the left-right spots and outputs it to the information acquisition unit 32. The information acquisition unit 32 acquires the intensity information of the left-right spots detected in the intensity detection unit 22. For example, the information acquisition unit 32 acquires a captured image captured in the intensity detection unit 22. In this case, the captured image includes the intensity information and position information of the left-right spots. In the processing step S12, the intensities of the left-right spots may be acquired multiple times in the same phase pattern P20. In this case, the information acquisition unit 32 may arithmetically operate the average value, maximum value, median value, or mode value of the intensities acquired multiple times and acquire the arithmetically operated result as the intensity information.

Subsequently, it is determined whether all the intensity information is acquired (processing step S13). For example, the information acquisition unit 32 determines whether all the intensity information is acquired. For example, if the phase pattern P20 initially set in the processing step S11 is the phase pattern P21 with the largest number of pixels in the region R2 in the X-axis direction, the information acquisition unit 32 determines that all the intensity information is acquired if the intensity information of the left-right spots due to the phase pattern P21 with the smallest number of pixels in the region R2 in the X-axis direction is acquired. If the phase pattern P20 initially set in the processing step S11 is the phase pattern P21 with the smallest number of pixels in the region R2 in the X-axis direction, the information acquisition unit 32 determines that all the intensity information is acquired if the intensity information of the left-right spots due to the phase pattern P21 with the largest number of pixels in the region R2 in the X-axis direction is acquired.

If it is determined that not all the intensity information is acquired (NO in processing step S13), then the phase pattern P20 is reset (processing step S14). For example, the position adjustment unit 34 causes the pattern setting unit 31 to reset the phase pattern P20. For example, if the phase pattern P20 initially set in the processing step S11 is the phase pattern P21 in which the number of pixels in the region R2 in the X-axis direction is the largest, the position adjustment unit 34 causes the spatial light modulation unit 3 to set the phase pattern P21 in which the number of pixels in the region R2 in the X-axis direction is one step smaller than the phase pattern P21 previously set. For example, if the phase pattern P20 initially set in the processing step S11 is the phase pattern P21 in which the number of pixels in the region R2 in the X-axis direction is the smallest, the position adjustment unit 34 causes the spatial light modulation unit 3 to set the phase pattern P21 in which the number of pixels in the region R2 in the X-axis direction is one step greater than the phase pattern P21 previously set. Once the processing step S14 is completed, the processing returns to the processing step S11.

If it is determined that all the intensity information is acquired (YES in the processing step S13), then the intensity information items of the left-right spots are compared (processing step S15). For example, the comparison unit 33 compares the intensity information items of the left-right spots. The comparison unit 33 acquires the intensity information of the left-right spots stored for the respective phase patterns P21 and compares the intensity information of the left spot and the intensity information of the right spot corresponding to each phase pattern P21. For example, the comparison unit 33 acquires the intensity information of the left-right spots stored for the respective phase patterns P21 and arithmetically operates the value of the intensity ratio of the intensity information of the left spot and the intensity information of the right spot corresponding to each phase pattern P21. For example, the comparison unit 33 outputs the comparison result obtained by comparing the intensity information items of the left-right spots to the information acquisition unit 32 and then stores it in the information acquisition unit 32.

FIG. 9A is a graph in which the comparison results of the intensity information of the left-right spots for the respective phase patterns P20 stored in the processing step S15 are plotted. In FIG. 9A, the vertical axis represents the value of the intensity ratio of the intensity of the left spot to the intensity of the right spot, and the horizontal axis represents the pixel position corresponding to each phase pattern P21. The pixel position corresponding to the phase pattern P21 is the pixel position where the boundary between the sub-patterns PS1 and PS2 is located in the phase pattern P21.

In the case where the processing step S15 is completed, the incident position P2 of the light L onto the spatial light modulation unit 3 is estimated (processing step S16). For example, the estimation unit 35 estimates the incident position P2 of the light L onto the spatial light modulation unit 3. The estimation unit 35 estimates the incident position P2 of the light L onto the spatial light modulation unit 3 on the basis of the result obtained by comparing the intensity information items of the left-right spots in the processing step S15. For example, the estimation unit 35 estimates the pixel position where the intensity of the left spot is equal to the intensity of the right spot as the incident position P2 of the light L onto the spatial light modulation unit 3. For example, the estimation unit 35 determines that the intensity of the left spot and the intensity of the right spot are equal in the case where the value of the intensity ratio of the left-right spots is 0.99 or more and 1.01 or less. For example, the estimation unit 35 may determine that the intensity of the left spot is equal to the intensity of the right spot in the case where the intensity ratio of the left-right spots is closest to a value of 1 among the comparison results of the intensity information of the left-right spots in the processing step S15.

For example, in FIG. 9A, in the case where the intensity ratio of the left-right spots is 1.0, the pixel position where the boundary between the sub-patterns PS1 and PS2 is located is "628". Thus, the estimation unit 35 estimates that the light L is incident on the position of "628" among the pixel positions of the display unit 13 in the X-axis direction. For example, the estimation unit 35 estimates that the centroid of incident position P2 is located at position "628" among the pixel positions of the display unit 13 in the X-axis direction.

The control unit 9 also executes the position search processing using the upper-lower spots in the same manner as the processing steps S11 to S16. The position search processing using the upper-lower spots differs from the position search processing using the left-right spots only in that the phase pattern P22 is used instead of the phase pattern P21, and the intensity information items of the upper-lower spots are compared. FIG. 9B is a graph where the comparison results of the intensity information of the upper-lower spots for the respective phase patterns P22 are plotted. In FIG. 9B, the vertical axis represents the value of the intensity ratio of the lower spot to the intensity of the lower spot, and the horizontal axis represents the pixel position corresponding to each phase pattern P22. The pixel position corresponding to the phase pattern P22 is the pixel position at which the boundary between the sub-pattern PS3 and the sub-pattern PS4 is located in the phase pattern P22.

For example, in FIG. 9B, in the case where the intensity ratio of the upper-lower spots is a value of 1.0, the pixel position at which the boundary between the sub-pattern PS3 and the sub-pattern PS4 is located is "464". Thus, the estimation unit 35 estimates that the light L is incident on the pixel position of "464" of the display unit 13 in the Z-axis direction. For example, the estimation unit 35 estimates that the centroid of the incident position P2 is incident on the position of "464" among the pixel positions of the display unit 13 in the Z-axis direction.

The description mentioned above is given for the example of the position estimation method executed by the spatial light modulation device 10, but the order of each processing operation and the main entity or component executing the processing are not limited to this example. For example, instead of the information acquisition unit 32, the comparison unit 33, the position adjustment unit 34, or the estimation unit 35 may execute the processing step S13. For example, the respective intensity information items may be compared after all intensity information of both the left-right spots and the upper-lower spots is acquired. For example, the respective intensity information items may be compared after all comparison results of intensity information of both the left-right spots and the upper-lower spots are acquired.

For example, the intensity information may be compared immediately after the intensity information of the left-right spots or the upper-lower spots in the respective phase patterns P20 is acquired. In other words, the processing step S15 may be executed between the processing step S12 and the processing step S13. In this case, for example, the comparison unit 33 compares the intensity information of the left spot with the intensity information of the right spot acquired in the immediately preceding processing step S12 and outputs the obtained comparison result of the intensity information of the left-right spots to the information acquisition unit 32. For example, the intensity information of the left-right spots and the upper-lower spots may be compared immediately after the information is acquired.

Figure 10:
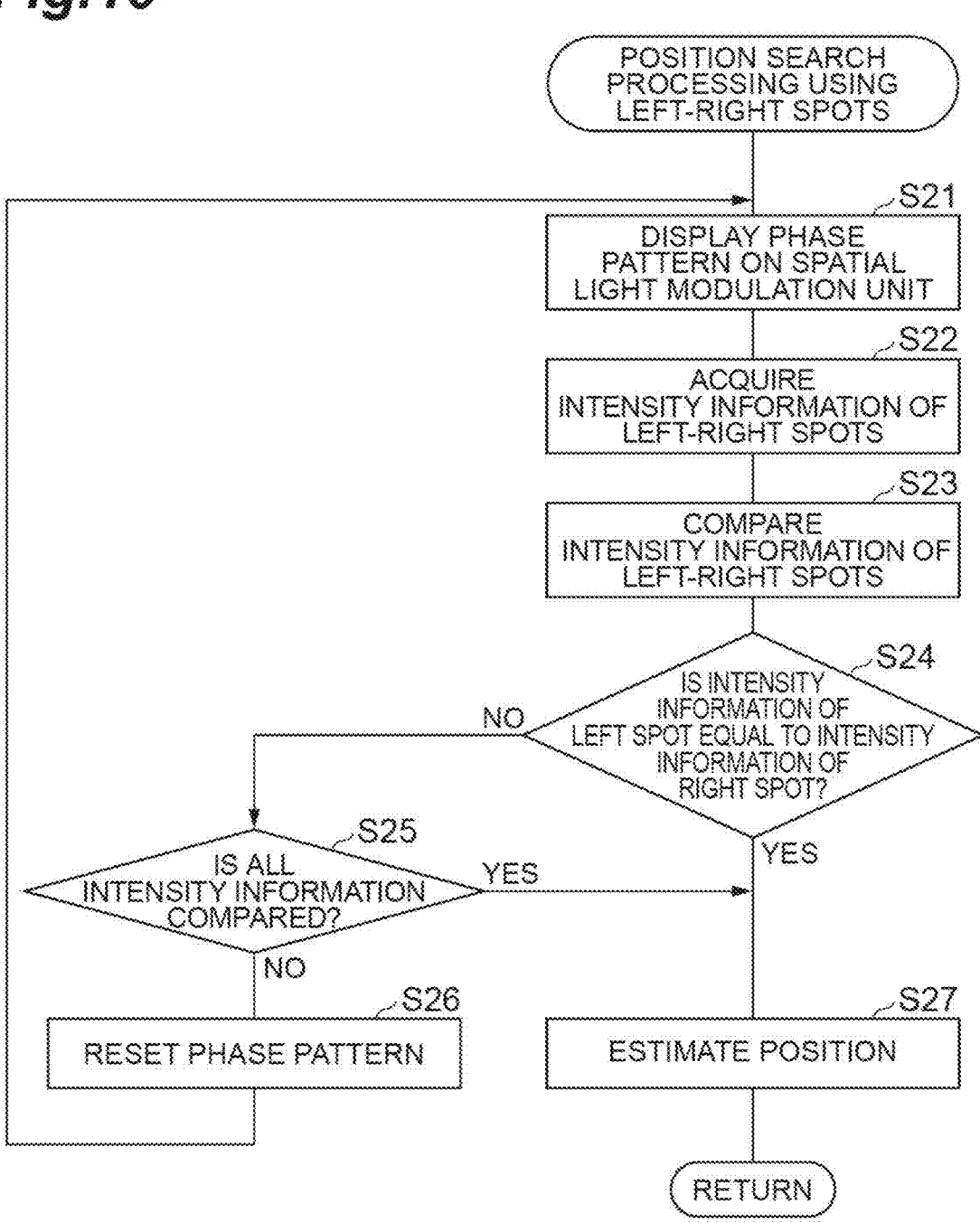
FIG. 10 is a flowchart illustrated to describe a position estimation process in a modification of the present embodiment.

With reference to FIG. 10, a modification of the position estimation method executed by the spatial light modulation device 10 is now described. FIG. 10 is a flowchart illustrated to describe the position estimation process according to the modification of the present embodiment. In this position search processing, the setting of the positional relationship between the phase pattern P20 and the incident light on the phase pattern P20 used for incident position estimation, as well as the acquisition of the intensity information of the focused light spot are repeated until it is determined that the intensity information items of the left and right focused light spots are equal. The following will exemplify a case in which the positional relationship between the phase pattern P20 and the incident light on the phase pattern P20 is changed by modifying the phase pattern displayed on the spatial light modulation unit 3. In the following, descriptions that overlap with the position estimation method described with reference to FIG. 8 will be omitted.

The phase pattern P20 used for the incident position estimation is first displayed on the spatial light modulation unit 3 (processing step S21). For example, in the processing step S21, processing similar to the processing step S11 described above is executed.

Subsequently, intensity information of the left-right spots is acquired (processing step S22). For example, in the processing step S22, processing similar to the processing step S12 described above is executed.

Subsequently, the intensity information items of the left-right spots are compared (processing step S23). For example, the comparison unit 33 compares the intensity information items of the left-right spots. The comparison unit 33 compares the intensity information of the left spot and the intensity information of the right spot, which are acquired in the immediately preceding processing step S22. For example, the comparison unit 33 arithmetically operates the value of the intensity ratio between the intensity information of the left spot and the intensity information of the right spot acquired in the immediately preceding processing step S22. For example, the comparison unit 33 outputs the comparison result obtained by comparing the intensity information items of the left-right spots to the information acquisition unit 32 and then stores it in the information acquisition unit 32.

Subsequently, it is determined whether the intensity information items of the left-right spots are equal to each other (processing step S24). For example, the comparison unit 33 determines whether the intensity information items of the left-right spots acquired in processing step S23 are equal to each other. For example, the comparison unit 33 arithmetically operates the value of the intensity ratio between the intensity of the left spot and the intensity of the right spot, and determines that the intensity of the left spot is equal to the intensity of the right spot in the case where the value of the intensity ratio between the left-right spots is 0.99 or more and 1.01 or less. If it is determined that the intensity information items of the left-right spots are equal to each other (YES in processing step S24), the processing proceeds to processing step S27.

If it is not determined that the intensity information items of the left-right spots are equal to each other (NO in processing step S24), it is determined whether or not all the intensity information is compared (processing step S25). For example, the comparison unit 33 determines whether or not all the intensity information is compared. For example, if the phase pattern P20 initially set in the processing step S21 is the phase pattern P21 with the largest number of pixels in the region R2 in the X-axis direction, the comparison unit 33 determines that all the intensity information is compared in the case where the intensity information of the left-right spots according to the phase pattern P21 with the smallest number of pixels in the region R2 in the X-axis direction is compared. If the phase pattern P20 initially set in the processing step S21 is the phase pattern P21 with the smallest number of pixels in the region R2 in the X-axis direction, the comparison unit 33 determines that all of the intensity information is compared in the case of comparing the intensity information the left-right spots according to the phase pattern P21 with the largest number of pixels in the region R2 in the X-axis direction.

If it is not determined that all of the intensity information is compared (NO in processing step S25), the phase pattern P20 is reset (processing step S26). For example, the position adjustment unit 34 causes the pattern setting unit 31 to reset the phase pattern P20. For example, in the processing step S24, processing similar to the processing step S14 described above is executed. If it is determined that all of the intensity information is compared (YES in processing step S25), the processing proceeds to processing step S27.

If it is determined that the intensity information items of the left-right spots are equal to each other (YES in processing step S24), or if it is determined that all the intensity information is compared (YES in processing step S25), the incident position P2 of the light L onto the spatial light modulation unit 3 is estimated (processing step S27). For example, the estimation unit 35 estimates the incident position P2 of the light L onto the spatial light modulation unit 3.

For example, if it is determined that the intensity information items of the left-right spots are equal to each other (YES in processing step S24), the estimation unit 35 estimates the pixel position corresponding to the phase pattern P21 in which the intensity information items of the left-right spots are determined to be equal in the processing step S24 as the incident position P2 of the light L onto the spatial light modulation unit 3. For example, the pixel position corresponding to the phase pattern P21 is the pixel position where the boundary between the sub-patterns PS1 and PS2 is located in the phase pattern P21.

For example, if it is determined that all the intensity information is compared (YES in step S25), the estimation unit 35 estimates the incident position P2 of the light L onto the spatial light modulation unit 3, based on the comparison result of all the intensity information. For example, the estimation unit 35 estimates the pixel position corresponding to the phase pattern P20 in which the intensity ratio of the left-right spots is closest to a value of 1 among the comparison results of the intensity information of all the left-right spots as the incident position P2 of the light L onto the spatial light modulation unit 3. For example, the pixel position corresponding to the phase pattern P20 is the pixel position where the boundary between the sub-patterns PS1 and PS2 is located in the phase pattern P21.

In the present modification, the control unit 9 also executes the position search processing using the upper-lower spots in a manner similar to the processing steps S21 to S27. The position search processing using the upper-lower spots differs from the position search processing using the left-right spots only in that the phase pattern P22 is used instead of the phase pattern P21, and the intensity information items of the upper-lower spots are compared.

The description mentioned above is given for one modification of the position estimation method executed by the spatial light modulation device 10, but the order of the respective processing operations and the main executing entity or component are not limited to this exemplary modification. For example, instead of the comparison unit 33, the position adjustment unit 34 or the estimation unit 35 may execute the processing step S24. For example, instead of the comparison unit 33, the information acquisition unit 32, the position adjustment unit 34, or the estimation unit 35 may execute the processing step S25. For example, the processing step S25 may be executed before the processing step S24. In this case, for example, the processing step S24 is executed if the result of the processing step S25 is NO, and further the processing step S26 is executed if the result of the processing step S24 is NO, and the processing step S27 is executed if the result of the processing step S24 is YES. If the result of the processing step S25 is YES, the processing step S27 is executed, and processing similar to the processing step S16 described above is executed.

Figure 11:
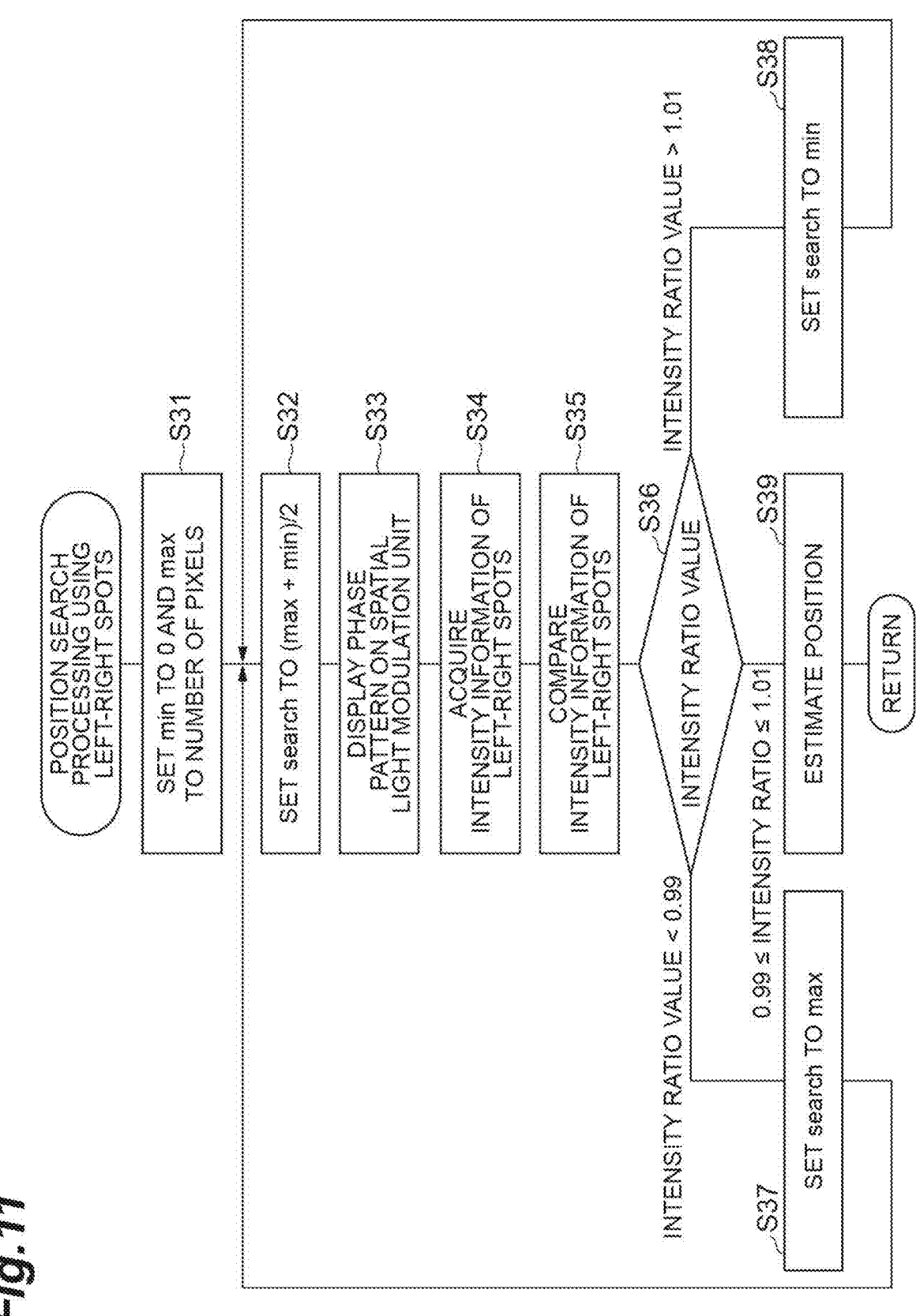
FIG. 11 is a flowchart illustrated to describe a position estimation process in another modification of the present embodiment.

Subsequently, referring to FIG. 11, another modification of the position estimation method executed by the spatial light modulation device 10 is now described. FIG. 11 is a flowchart illustrated to describe a position estimation process according to another modification of the present embodiment. In this position search processing, the setting of the positional relationship between the phase pattern P20 and the incident light on the phase pattern P20 and the acquisition of intensity information are repeated using the bisection method. In this bisection method, the minimum value is set to 0, and the maximum value is set to the number of pixels of the display unit 13 in the X-axis direction or the Z-axis direction. The following will exemplify a case in which the positional relationship between the phase pattern P20 and the incident light on the phase pattern P20 is changed by modifying the phase pattern displayed on the spatial light modulation unit 3. Descriptions that overlap with the position estimation method mentioned in FIG. 8 or FIG. 10 will be omitted hereinafter.

Initially, "min" is set to 0, and "max" is set to the number of pixels (processing step S31). The "min" is a variable indicating the minimum value in the bisection method. The "max" is a variable indicating the maximum value in the bisection method. For example, the position adjustment unit 34 sets "min" to 0, and "max" to the number of pixels of the display unit 13 in the X-axis direction.

Subsequently, "search" is set to (max+min)/2 (processing step S32). The "search" is a variable that specifies the phase pattern P20 to be displayed on the spatial light modulation unit 3. The "search" indicates, for example, the pixel position at which the boundary between the sub-patterns PS1 and PS2 in the phase pattern P20 to be displayed on the spatial light modulation unit 3 is located. For example, the position adjustment unit 34 sets the "search" to a value of (max+min)/2.

Subsequently, the phase pattern P20 used for the incident position estimation is displayed on the spatial light modulation unit 3 (processing step S33). For example, the pattern setting unit 31 sets the phase pattern P20 corresponding to "search" set in the processing step S32 in the spatial light modulation unit 3 and causes the spatial light modulation unit 3 to display it.

Subsequently, the intensity information of the left-right spots is acquired (processing step S34). For example, in the processing step S34, processing similar to the processing step S12 described above is executed.

Subsequently, the intensity information items of the left-right spots are compared (processing step S35). For example, in the processing step S35, processing similar to the processing step S23 described above is executed.

Subsequently, the value of the intensity ratio of the left-right spots is determined (processing step S36). For example, the comparison unit 33 determines the value of the intensity ratio of the left-right spots. If the value of the intensity ratio of the left-right spots is smaller than a threshold value, then the processing proceeds to processing step S37. If the value of the intensity ratio of the left-right spots is greater than the threshold value, then the processing proceeds to processing step S38. If the value of the intensity ratio of the left-right spots is within the range of the threshold value, then the processing proceeds to processing step S39. For example, the threshold range is a range where the intensity of the left spot and the intensity of the right spot can be determined to be equal. For example, if the value of the intensity ratio of the left-right spots is smaller than 0.99, then the processing proceeds to the processing step S37. If the value of the intensity ratio of the left-right spots is greater than 1.01, then the processing proceeds to the processing step S38. If the value of the intensity ratio of the left-right spots is 0.99 or more and 1.01 or less, then the processing proceeds to the processing step S39.

If the value of the intensity ratio of the left-right spots is smaller than the threshold, then "max" is set to "search" (processing step S37). For example, the position adjustment unit 34 sets the current value of "max" to "search". Once the processing step S37 is completed, the processing returns to the processing step S32.

If the value of the intensity ratio of the left-right spots is greater than the threshold, then "min" is set to "search" (processing step S38). For example, the pattern setting unit 31 sets the current value of "min" to "search". Once the processing step S38 is completed, the processing returns to the processing step S32.

If the value of the intensity ratio of the left-right spots is within the threshold range, then the incident position P2 of the light L onto the spatial light modulation unit 3 is estimated (processing step S39). For example, the estimation unit 35 estimates the pixel position corresponding to the phase pattern P20 set in the immediately preceding processing step S33 as the incident position P2 of the light L onto the spatial light modulation unit 3. For example, the pixel position corresponding to the phase pattern P20 is the pixel position where the boundary between the sub-patterns PS1 and PS2 is located in the phase pattern P21.

In the present modification, the control unit 9 also executes the position search processing using the upper-lower spots in a manner similar to the processing steps S31 to S39. The position search processing using the upper-lower spots differs from the position search processing using the left-right spots only in that the phase pattern P22 is used instead of the phase pattern P21, and the intensity information items of the upper-lower spots are compared.

The description mentioned above is given for one modification of the position estimation method executed by the spatial light modulation device 10, but the main executing entity or component is not limited to this exemplary modification. For example, the pattern setting unit 31 or the estimation unit 35 may execute the processing step S31 instead of the position adjustment unit 34. For example, the pattern setting unit 31 or the estimation unit 35 may execute the processing step S32 instead of the position adjustment unit 34. For example, the position adjustment unit 34 or the estimation unit 35 may execute the processing step S36 instead of the comparison unit 33. Additionally, without executing the processing step S36, any of the processing steps S37, S38, and S39 may be executed on the basis of the comparison result of the intensity information in the processing step S35.

The exemplary position estimation method described with reference to FIG. 8, the exemplary position estimation method described with reference to FIG. 10, and the exemplary position estimation method described with reference to FIG. 11 may be combined with each other. For example, the position search processing using the left-right spots and the position search processing using the upper-lower spots may be performed by different processing operations described in different examples.

Figure 12:
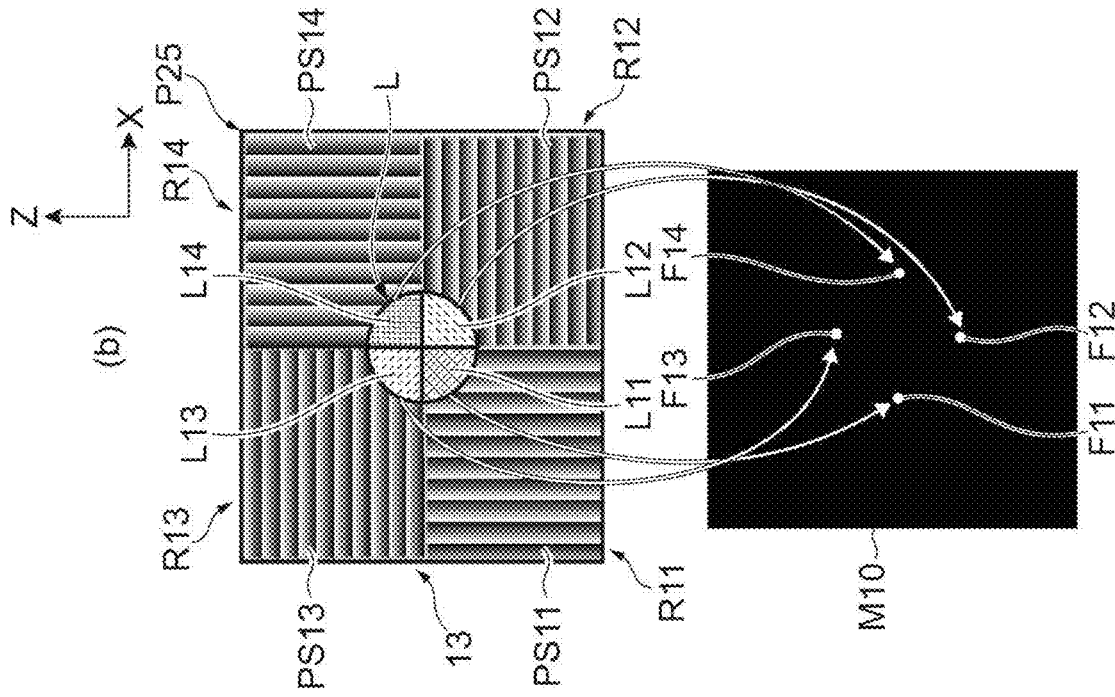
FIGS. 12A and 12B are diagrams illustrating the relationship between the phase pattern used for estimating the position of incidence and the focused light spot in the modification of the present embodiment.
Figure 12:
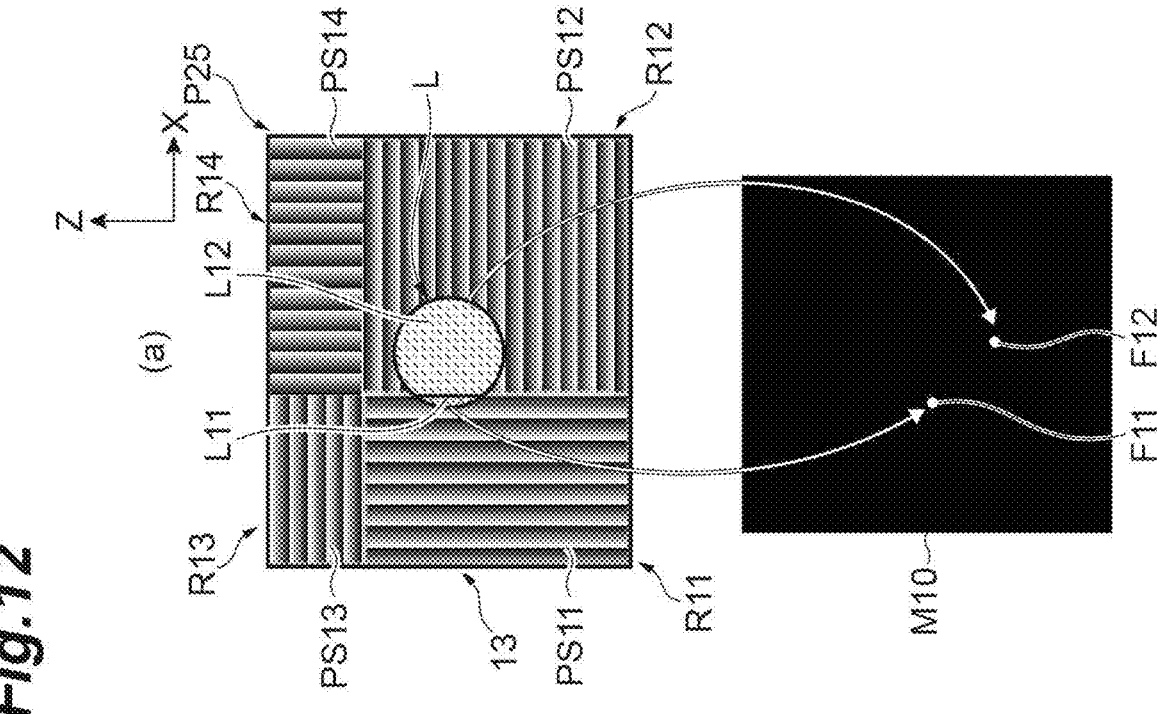

Referring to FIGS. 12A and 12B, the spatial light modulation device 10 according to a modification of the present embodiment is now described. FIGS. 12A and 12B are diagrams illustrating the relationship between the phase pattern P20 used for the incident position estimation and the focused light spots according to the modification of the present embodiment. The present modification is generally similar or the same as the above-mentioned embodiment and modifications. The present modification differs from the above-mentioned embodiment in terms of the configuration of the phase pattern P20. The difference between the above-mentioned embodiment and the present modification is now mainly described.

In the present modification, the phase pattern P20 used for incident position estimation includes a phase pattern P25 instead of the phase patterns P21 and P22 described above. For example, the spatial light modulation unit 3 sequentially displays a plurality of phase patterns P25 used for incident position estimation with different configurations. The plurality of phase patterns P25 differ from each other in terms of the arrangement configuration of the regions where the multiple types of sub-patterns are located in the respective phase patterns P25. In other words, the arrangement configuration of the sub-patterns in the phase pattern P25 differs for the respective phase patterns P25.

Each of the phase patterns P25 includes multiple types of sub-patterns PS11, PS12, PS13, and PS14. The arrangement configurations of the sub-patterns PS11, PS12, PS13, and PS14 in the phase pattern P25 differ for the respective phase patterns P25. The sub-pattern PS11 is located in the region R11. The sub-pattern PS12 is located in the region R12. The sub-pattern PS13 is located in the region R13. The sub-pattern PS14 is located in the region R14.

The regions R11, R12, R13, and R14 are regions into which the display unit 13 is divided, for example, in the X-axis direction and the Z-axis direction. The regions R11 and R12 are mutually adjacent in the left-right direction. The regions R11 and R13 are mutually adjacent in the up-down direction. The regions R13 and R14 are mutually adjacent in the left-right direction. The regions R12 and R14 are mutually adjacent in the up-down direction.

The regions R11 and R12 are arranged in the left-right direction. The regions R11 and R13 are arranged in the up-down direction. The regions R13 and R14 are arranged in the left-right direction. The regions R12 and R14 are arranged in the up-down direction. The regions R11, R12, R13, and R14 form the display unit 13. The region R11 is located to the left of the region R12. The region R11 is located below the region R13. The region R13 is located to the left of the region R14. The region R12 is located below the region R14. The regions R11, R12, R13, and R14 are configured to divide the phase pattern P25 into four in the X-axis direction and the Z-axis direction.

The boundary between the regions R11 and R12 extends along the Z-axis direction. The boundary between the regions R13 and R14 extends along the Z-axis direction. For example, the boundary between the regions R11 and R12 and the boundary between the regions R13 and R14 extend parallel to the Z-axis direction. The term "parallel" herein includes the range of tolerances considered for the positioning of the spatial light modulation unit 3. The boundary between the regions R11 and R12 is continuous with the boundary between the regions R13 and R14, and it is located on the same straight line as the boundary between the regions R13 and R14.

The boundary between the regions R11 and R13 extends along the X-axis direction. The boundary between the regions R12 and R14 extends along the X-axis direction. For example, the boundary between the region R11 and the region R13 and the boundary between the region R12 and the region R14 extend parallel to the X-axis direction. The boundary between the region R11 and the region R13 is continuous with the boundary between the region R12 and the region R14 and is located on the same straight line as the boundary between the region R12 and the region R14. The boundary between the region R11 and the region R12 and the boundary between the region R11 and the region R13 intersect with each other. For example, the boundary between the region R11 and the region R12 and the boundary between the region R11 and the region R13 are perpendicular to each other. The term "perpendicular" herein includes the range of tolerances considered for the pixel positions in the display unit 13.

The sub-patterns PS11, PS12, PS13, and PS14 are configured to form focused light spots F11, F12, F13, and F14 at different positions. The sub-pattern PS11 is configured to form the focused light spot F11. The sub-pattern PS12 is configured to form the focused light spot F12. The sub-pattern PS13 is configured to form the focused light spot F13. The sub-pattern PS14 is configured to form the focused light spot F14.

The light L is incident on each of the phase patterns P25 illustrated in FIGS. 12A and 12B. The light L is modulated by the phase pattern P25 and emitted toward the detection unit 7. In the plurality of the phase patterns P25 set by the pattern setting unit 31, the region ratios of the regions R11, R12, R13, and R14 differ for the respective phase patterns P25. In the plurality of the phase patterns P25 set by the pattern setting unit 31, the positions of the boundary between the regions R11, R12, R13, and R14 differ for the respective phase patterns P25. In the plurality of the phase patterns P25 illustrated in FIGS. 12A and 12B, the position where the light L is incident is the same.

The sub-pattern PS11 modulates light L11 that is incident on the sub-pattern PS11 of the light L and forms the focused light spot F11 on the intensity detection unit 22. The sub-pattern PS12 modulates light L12 that is incident on the sub-pattern PS12 of the light L and forms the focused light spot F12 on the intensity detection unit 22. The sub-pattern PS13 modulates light L13 that is incident on the sub-pattern PS13 of the light L and forms the focused light spot F13 on the intensity detection unit 22. The sub-pattern PS14 modulates light L14 that is incident on the sub-pattern PS14 of the light L and forms the focused light spot F14 on the intensity detection unit 22. The intensity detection unit 22 captures an image M10 in which the focused light spots formed on the intensity detection unit 22 are displayed.

In the phase pattern P25 illustrated in FIG. 12A, the light L is incident only on the sub-patterns PS11 and PS12 of the phase pattern P25. Thus, the focused light spots F13 and F14 are not formed in the intensity detection unit 22, and only the focused light spots F11 and F12 are formed in the intensity detection unit 22. As a result, only the focused light spots F11 and F12 are displayed in the image M10. In the phase pattern P25, the region of the light L12 is greater than the region of the light L11. Thus, the intensity of the focused light spot F12 is greater than the intensity of the focused light spot F11.

In the phase pattern P25 illustrated in FIG. 12B, the light L is incident on all of the sub-patterns PS11, PS12, PS13, and PS14 of the phase pattern P25. As a result, the focused light spots F11, F12, F13, and F14 are displayed in the image M10. In the phase pattern P25, the regions of the light beams L11, L12, L13, and L14 are equal to each other. Thus, the intensities of the focused light spots F11, F12, F13, and F14 are equal to each other.

As described above, different intensity information items of the focused light spots F11, F12, F13, and F14 are detected by the different phase patterns P25. The intensities of the focused light spots F11, F12, F13, and F14 are equal to each other in the phase pattern P25 illustrated in FIG. 12B. Thus, the estimation unit 35 estimates that the light beam L is incident on a position corresponding to the phase pattern P25 illustrated in FIG. 12B. In this way, the incident position P2 of the light L onto the spatial light modulation unit 3 is estimated.

The estimation unit 35 estimates the incident position P2 of the light L onto the spatial light modulation unit 3 in the X-axis direction on the basis of, for example, the comparison result of the intensity information of the pair of focused light spots F11 and F12 and the comparison result of the intensity information of the pair of focused light spots F13 and F14. The pair of focused light spots F11 and F12 are formed by the light L incident on the pair of regions R11 and R12, respectively. The pair of regions R11 and R12 are mutually adjacent in the X-axis direction in the phase pattern P25. The pair of focused light spots F13 and F14 are formed by the light L incident on the pair of regions R13 and R14, respectively. The pair of regions R13 and R14 are mutually adjacent in the X-axis direction in the phase pattern P25.

For example, the estimation unit 35 further estimates the incident position P2 of the light L onto the spatial light modulation unit 3 in the Z-axis direction on the basis of the comparison result of the intensity information of the pair of focused light spots F11 and F13 and the comparison result of the intensity information of the pair of focused light spots F12 and F14. The pair of focused light spots F11 and F13 are formed by the light L incident on the pair of regions R11 and R13, respectively. The pair of regions R11 and R13 are mutually adjacent in the Z-axis direction in the phase pattern P25. The pair of focused light spots F12 and F14 are formed by the light L incident on the pair of regions R12 and R14, respectively. The pair of regions R12 and R14 are mutually adjacent in the Z-axis direction in the phase pattern P25.

As a modification of the present embodiment, the estimation unit 35 may estimate the incident position P2 of the light L onto the spatial light modulation unit 3 on the basis of the comparison result of the intensity information of the pair of focused light spots F11 and F14 and the comparison result of the intensity information of the pair of focused light spots F12 and F13. The estimation unit 35 may estimate the incident position P2 of the light L onto the spatial light modulation unit 3 on the basis of the comparison result of the intensity information of the focused light spots F11, F12, F13, and F14 using a combination other than the combinations described above.

For example, the position of the boundary between the sub-patterns PS11, PS12, PS13, and PS14 of the phase pattern P25 illustrated in FIG. 12B is estimated as the incident position P2 of the light L onto the spatial light modulation unit 3 in the XZ-axis direction. In other words, the position of the intersection of the boundaries formed by the regions R11, R12, R13, and R14 is estimated as the incident position P2 of the light L onto the spatial light modulation unit 3 in the XZ-axis direction. Furthermore, in other words, the position where the boundary between the region R11 and the region R12 and the boundary between the region R13 and the region R14 intersect is estimated as the incident position P2 of the light L onto the spatial light modulation unit 3 in the XZ-axis direction.

In the present modification, the description mentioned above is given for the example in which the change in the positional relationship between the phase pattern P1 and the incident light on the phase pattern P1 in the position estimation process is executed by changing the phase pattern P1 displayed on the spatial light modulation unit 3. The change in the positional relationship may be implemented by similar processing by changing the optical axis position of the incident light on the phase pattern P1.

Figure 13:
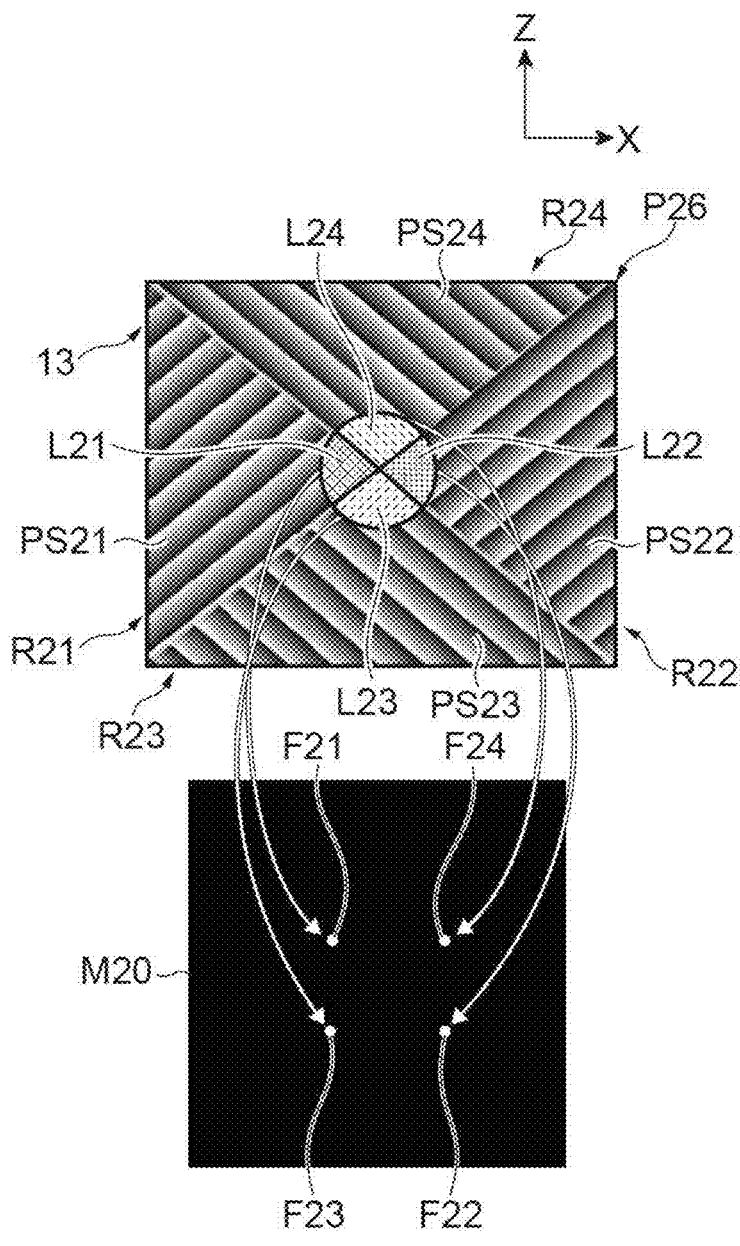
FIG. 13 is a diagram illustrating the relationship between the phase pattern used for estimating the position of incidence and the focused light spot in the other modification of the present embodiment.

Subsequently, referring to FIG. 13, a spatial light modulation device 10 according to yet another modification of the present embodiment is now described. FIG. 13 is a diagram illustrating the relationship between the phase pattern P20 used for the incident position estimation and the focused light spot in the modification of the present embodiment. The present modification is generally similar or the same as the modifications described in FIGS. 12A and 12B. The present modification differs from the modifications described in FIGS. 12A and 12B in terms of the configuration of the phase pattern P20. The differences between the present modification and the modifications described in FIGS. 12A and 12B are now mainly described.

In the present modification, the phase pattern P20 includes a phase pattern P26 instead of the above-mentioned phase pattern P25. For example, the spatial light modulation unit 3 sequentially displays a plurality of phase patterns P26 having mutually different configurations. The plurality of phase patterns P26 differ from each other in terms of the arrangement configuration of the regions where the multiple types of sub-patterns are located in the respective phase patterns P26. In other words, the arrangement configuration of the sub-patterns in the phase pattern P26 differs for the respective phase patterns P26.

Each of the phase patterns P26 includes multiple types of sub-patterns PS21, PS22, PS23, and PS24, similar to the phase pattern P25. The arrangement configurations of the sub-patterns PS21, PS22, PS23, and PS24 in the phase pattern P26 differ for the respective phase patterns P26. The sub-pattern PS21 is located in the region R21. The sub-pattern PS22 is located in the region R22. The sub-pattern PS23 is located in the region R23. The sub-pattern PS24 is located in the region R24.

The regions R21, R22, R23, and R24 are regions into which the display unit 13 is divided, for example, in the X-axis and Z-axis directions. The display unit 13 is constituted by the regions R21, R22, R23, and R24. The regions R21, R22, R23, and R24 are configured to divide the phase pattern P26 into four in the X-axis direction and the Z-axis direction. The regions R21 and R23 are mutually adjacent in a first inclination direction that slopes in the X-axis direction and the Z-axis direction. The regions R21 and R24 are mutually adjacent in a second inclination direction that slopes in the X-axis direction and the Z-axis direction. The regions R22 and R23 are mutually adjacent in the second inclination direction that slopes in the X-axis direction and the Z-axis direction. The regions R22 and R24 are mutually adjacent in the first inclination direction that slopes in the X-axis direction and the Z-axis direction. The first inclination direction and the second inclination direction intersect with each other.

The boundary between the regions R21 and R23 is inclined with respect to the X-axis direction and the Z-axis direction. The boundary between the regions R22 and R24 is inclined with respect to the X-axis direction and the Z-axis direction. The boundary between the region R21 and the region R23 is continuous with the boundary between the region R22 and the region R24, and is located on the same straight line as the boundary between the region R22 and the region R24.

The boundary between the region R21 and the region R24 is inclined with respect to the X-axis direction and the Z-axis direction. The boundary between the region R22 and the region R23 is inclined with respect to the X-axis direction and the Z-axis direction. The boundary between the region R21 and the region R24 is continuous with the boundary between the region R22 and the region R23, and is located on the same straight line as the boundary between the region R22 and the region R23. The boundary between the region R21 and the region R23 and the boundary between the region R21 and the region R24 intersect with each other. The boundary between the region R21 and the region R23 and the boundary between the region R21 and the region R24 may be perpendicular to each other.

The sub-patterns PS21, PS22, PS23, and PS24 are configured to form focused light spots F21, F22, F23, and F24 in different positions from each other. The sub-pattern PS21 is configured to form the focused light spot F21. The sub-pattern PS22 is configured to form the focused light spot F22. The sub-pattern PS23 is configured to form the focused light spot F23. The sub-pattern PS24 is configured to form the focused light spot F24.

The light L is modulated by the phase pattern P26 and emitted toward the detection unit 7. In the plurality of phase patterns P26 set by the pattern setting unit 31, the region ratios of the regions R21, R22, R23, and R24 differ for the respective phase patterns P26. In the plurality of the phase patterns P26 set by the pattern setting unit 31, the positions of the boundaries between the regions R21, R22, R23, and R24 differ for the respective phase patterns P26.

The sub-pattern PS21 modulates light L21, which is incident on the sub-pattern PS21 of the light L, and forms the focused light spot F21 on the intensity detection unit 22. The sub-pattern PS22 modulates light L12, which is incident on the sub-pattern PS22 of the light L, and forms the focused light spot F22 on the intensity detection unit 22. The sub-pattern PS23 modulates light L23, which is incident on the sub-pattern PS23 of the light L, and forms the focused light spot F23 on the intensity detection unit 22. The sub-pattern PS24 modulates light L24, which is incident on the sub-pattern PS24 of the light L, and forms the focused light spot F24 on the intensity detection unit 22. The intensity detection unit 22 captures an image M20 in which the focused light spots formed on the intensity detection unit 22 are displayed.

In the phase pattern P26 illustrated in FIG. 13, the light L is incident on all of the sub-patterns PS21, PS22, PS23, and PS24 of the phase pattern P26. As a result, the focused light spots F21, F22, F23, and F24 are displayed in the image M20. In the phase pattern P26, the regions of the lights L21, L22, L23, and L24 are equal to each other. Thus, the intensities of the focused light spots F21, F22, F23, and F24 are equal to each other.

As described above, the intensities of the focused light spots F21, F22, F23, and F24 are equal to each other in the phase pattern P26 illustrated in FIG. 13. Thus, the estimation unit 35 estimates that the light L is incident at a position corresponding to the phase pattern P26 illustrated in FIG. 13.

The estimation unit 35 estimates the incident position P2 of the light L onto the spatial light modulation unit 3 on the basis of, for example, the comparison result of the intensity information of the pair of focused light spots F21 and F23 and the comparison result of the intensity information of the pair of focused light spots F22 and F23. The pair of focused light spots F21 and F23 are formed by the light L incident on the pair of regions R21 and R23, respectively. The pair of regions R21 and R23 are mutually adjacent in the first inclination direction in the phase pattern P26. The pair of focused light spots F22 and F23 are formed by the light L incident on the pair of regions R22 and R23, respectively. The pair of regions R22 and R23 are mutually adjacent in the second inclination direction in the phase pattern P26. For example, in the case where the first inclination direction corresponds to the first direction, the second inclination direction corresponds to the second direction.

As a modification of the present embodiment, the boundary between the region R21 and the region R23 and the boundary between the region R21 and the region R24 are acceptable without being perpendicular to each other. The boundary between the region R21 and the region R23 is acceptable without being located on the same straight line as the boundary between the region R22 and the region R24. The boundary between the region R21 and the region R24 is acceptable without being located on the same straight line as the boundary between the region R22 and the region R23. In these cases, considering the intersection of the boundaries formed by the regions R21, R22, R23, and R24 and the angle formed by each boundary, the intensity information items of the focused light spots F21, F22, F23, and F24 are compared, and the incident position P2 onto the spatial light modulation unit 3 is estimated.

Subsequently, the operations and effects of the processing device 1, the spatial light modulation device 10, and the position estimation method are now described.

In the spatial light modulation device 10, the phase pattern P1 set by the pattern setting unit 31 includes the phase pattern P20 used for the incident position estimation. The phase pattern P20 is configured to form a plurality of focused light spots in the intensity detection unit 22 by the light L modulated in the spatial light modulation unit 3. The estimation unit 35 estimates the incident position P2 of the light L onto the spatial light modulation unit 3 on the basis of the comparison results of the intensity information of the plurality of focused light spots. The comparison results of the intensity information of the plurality of focused light spots allow for easy estimation of the incident position P2 of the light L in the phase pattern P1. Thus, in the spatial light modulation device 10, it is possible to easily estimate the incident position P2 of the light L onto the spatial light modulation unit 3.

Figure 14:
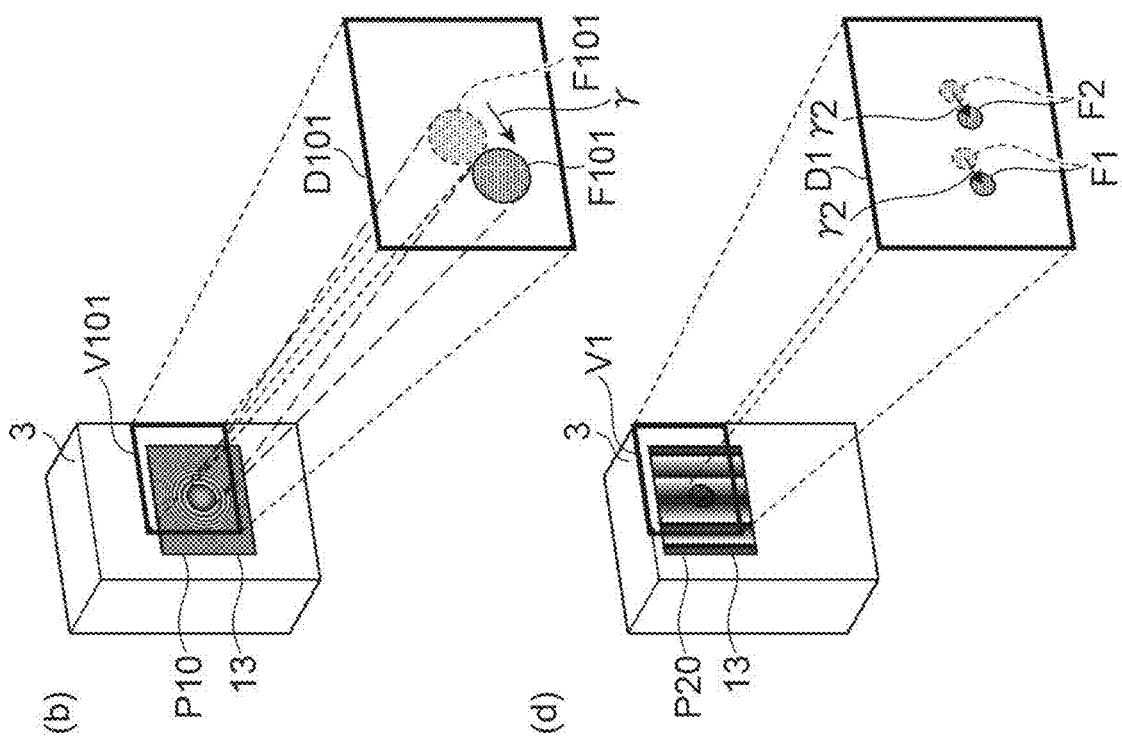
FIGS. 14A to 14D are diagrams illustrated to describe the misalignment of the focused light spot depending on the misalignment of the intensity detection unit.
Figure 14:
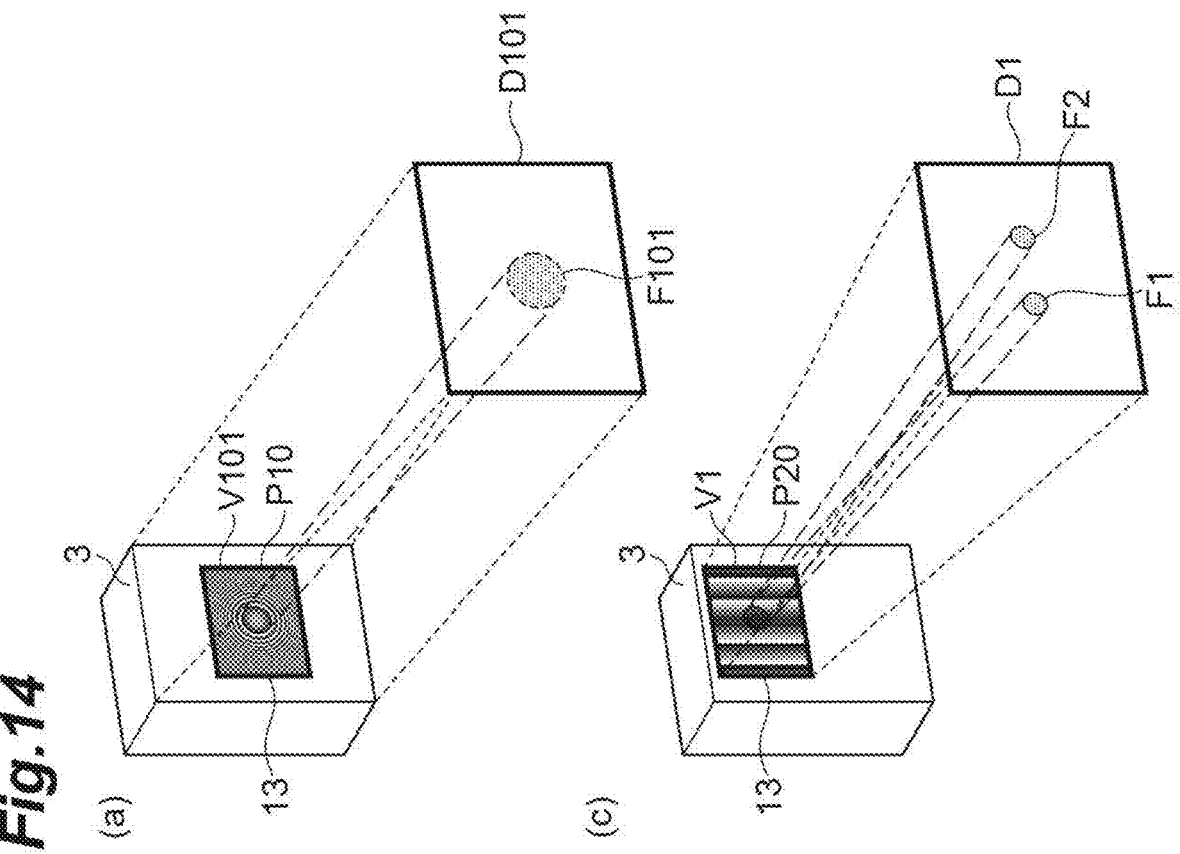

FIGS. 14A and 14B illustrate the relationship between the phase pattern P10 used for processing and the image captured by the image-capture device 19. In FIGS. 14A and 14B, a range D101 captured by the image-capture device 19 corresponds to a range V101 in the spatial light modulation unit 3. The range D101 corresponds to the image-capture surface, and the range V101 corresponds to the field of view range. In FIGS. 14A and 14B, light is appropriately incident on the phase pattern P10 displayed on the display unit 13, and an image F101 is formed on the image-capture device 19 by the phase pattern P10.

FIGS. 14C and 14D illustrate the relationship between the phase pattern P20 used for the incident position estimation and the intensity information acquired by the intensity detection unit 22. In FIGS. 14C and 14D, a range D1 where the intensity detection unit 22 is capable of acquiring intensity information corresponds to a range V1 in the spatial light modulation unit 3. If the intensity detection unit 22 is an image-capture device, the range D1 corresponds to the image-capture surface, and the range V1 corresponds to the field of view range. In FIGS. 14C and 14D, light is appropriately incident on the phase pattern P20 displayed on the display unit 13, and the phase pattern P20 forms the focused light spots F1 and F2 on the intensity detection unit 22.

In FIG. 14A, the range V101 matches and appropriately corresponds to the range where the display unit 13 displays the phase pattern P10. In FIG. 14C, the range V1 also matches and appropriately corresponds to the range where the display unit 13 displays the phase pattern P20. In FIG. 14B, the range V101 is misaligned with the range where the display unit 13 displays the phase pattern P10. The state illustrated in FIG. 14B may occur, for example, if external factors such as vibration or changes in ambient temperature cause a misalignment of the spatial light modulation unit 3, the image-capture device 19, or the optical system located between the image-capture device 19 and the spatial light modulation unit 3. In FIG. 14D, the range V1 is also misaligned with the range where the display unit 13 displays the phase pattern P20. The state illustrated in FIG. 14D may occur, for example, if external factors such as vibration or changes in ambient temperature cause a misalignment of the spatial light modulation unit 3, the intensity detection unit 22, or the optical system located between the intensity detection unit 22 and the spatial light modulation unit 3.

In FIG. 14B, the image F101 is misaligned in a direction $\gamma$ with respect to the range D101, even though the incident position of light onto the spatial light modulation unit 3 remains unchanged between FIG. 14A and FIG. 14B. This indicates that the movement of the image in the image-capture device 19 is not correlated with the movement of the incident position of the light on the spatial light modulation unit 3. For this reason, even if the spatial light modulation unit 3 and the image-capture device 19 are calibrated in the state illustrated in FIG. 14A, the incident position P2 of the light L onto the spatial light modulation unit 3 fails to be estimated from the movement of the image F101 captured by the image-capture device 19.

Similarly, in FIG. 14D, the focused light spots F1 and F2 are misaligned in a direction $\gamma2$ with respect to the range D1, even though the incident position of light onto the spatial light modulation unit 3 remains unchanged between FIG. 14C and FIG. 14D. In this way, the movement of the focused light spot in the intensity detection unit 22 is not correlated with the movement of the incident position of light onto the spatial light modulation unit 3. For this reason, even if the spatial light modulation unit 3 and the intensity detection unit 22 are calibrated in the state illustrated in FIG. 14C, the incident position P2 of the light L onto the spatial light modulation unit 3 fails to be estimated from the movement of the focused light spots F1 and F2 detected by the intensity detection unit 22.

Regarding the above points, the estimation unit 35 estimates the incident position P2 of the light onto the spatial light modulation unit 3 on the basis of the comparison result of the intensity information of the multiple focused light spots detected by the intensity detection unit 22. In the case where the phase pattern P20 used for the incident position estimation is used, multiple focused light spots can be formed on the intensity detection unit 22.

For example, in the case where the phase pattern P20 used for the incident position estimation is used as illustrated in FIGS. 14C and 14D, the estimation unit 35 is capable of estimating the incident position of light onto the spatial light modulation unit 3 on the basis of the comparison result between the intensity information of the focused light spot F1 and the intensity information of the focused light spot F2. The ratio of the intensity of the focused light spot F1 to the intensity of the focused light spot F2 remains unchanged between the state illustrated in FIG. 14C and the state illustrated in FIG. 14D. Thus, in the case where the phase pattern P20 is used, the estimation unit 35 is capable of estimating that the incident position of light onto the spatial light modulation unit 3 remains unchanged in FIG. 14D on the basis of the comparison result between the intensity information of the focused light spot F1 and the intensity information of the focused light spot F2. Thus, the spatial light modulation device 10 allows the incident position P2 of the light L onto the spatial light modulation unit 3 to be easily and accurately estimated without calibrating the spatial light modulation unit 3, the intensity detection unit 22, and other optical systems.

The easy estimation of the incident position P2 of the light L onto the spatial light modulation unit 3 enables the laser light to be reduced or prevented from being unintentionally irradiated on other optical elements of the processing device 1 due to a misalignment in the laser light. This makes it also possible to reduce or prevent damage to other optical elements of the processing device 1. Furthermore, the spatial light modulation device 10 can achieve both adjustment of the phase pattern P1 and estimation of the incident position P2 even without an image-capture device 19 that captures the NFP.

The estimation unit 35 estimates the incident position P2 of the light L onto the spatial light modulation unit 3 on the basis of the positional relationship between the phase pattern P20 and the incident light on the phase pattern P20. This positional relationship is a positional relationship in which the intensities of at least two of multiple focused light spots are equal to each other. Thus, the incident position P2 of the light L onto the spatial light modulation unit 3 can be estimated more accurately.

The estimation unit 35 estimates the incident position P2 of the light L onto the spatial light modulation unit 3 on the basis of the comparison result of the intensity information of the pair of focused light spots formed by the light L incident on the pair of adjacent regions in the first direction in the phase pattern P20 and the comparison result of the intensity information of the pair of focused light spots formed by the light L incident on the pair of adjacent regions in the second direction in the phase pattern P20. The second direction intersects with the first direction. In this case, the incident position P2 of the light L onto the spatial light modulation unit 3 is capable of being estimated in both the first direction and the second direction. As a result, it is possible to estimate the incident position P2 of the light L onto the spatial light modulation unit 3 more accurately.

The position adjustment unit 34 may adjust the positional relationship between the phase pattern P20 and the incident light on the phase pattern P20 on the basis of the intensity information of the focused light spots. After the positional relationship is adjusted by the position adjustment unit 34, the intensity detection unit 22 further detects the intensity information of multiple focused light spots. The estimation unit 35 estimates the incident position P2 of the light L onto the spatial light modulation unit 3 on the basis of the comparison result of the intensity information of the multiple focused light spots detected after the positional relationship is adjusted. In this case, the positional relationship between the phase pattern P20 and the incident light on the phase pattern P20 can be further adjusted using the intensity information after the positional relationship between the phase pattern P20 and the incident light on the phase pattern P20 is adjusted. Thus, the positional relationship can be adjusted more easily and accurately.

In adjusting the positional relationship between the phase pattern P20 and the incident light on the phase pattern P20, the position adjustment unit 34 executes at least one of the following: changing the phase pattern P20 displayed on the spatial light modulation unit 3 and changing the optical axis position of the incident light on the phase pattern P20. In this case, the positional relationship between the phase pattern P20 and the incident light on the phase pattern P20 can be further easily adjusted.

The position adjustment unit 34 may adjust the positional relationship between the phase pattern P20 and the incident light on the phase pattern P20 on the basis of the intensity information of the multiple focused light spots in such a way as that the intensity ratio of the multiple focused light spots approaches a value of 1. In this case, the incident position P2 of the light L to the spatial light modulation unit 3 can be estimated more easily and accurately.

The pattern setting unit 31 sets a plurality of the phase patterns P20 with different configurations to be used as the phase pattern P20 configured to form multiple focused light spots on the intensity detection unit 22. The spatial light modulation unit 3 sequentially displays the plurality of the phase patterns P20. The estimation unit 35 estimates the incident position P2 of the light L in the spatial light modulation unit 3 on the basis of the intensity information of the focused light spots formed by each of the plurality of the phase patterns P20. In this case, the positional relationship between the phase pattern P20 and the incident light on the phase pattern P20 can be adjusted more easily and accurately.

Each of the plurality of the phase patterns P20 includes multiple types of sub-patterns. The multiple types of sub-patterns are located in different regions in the phase pattern P20 and form different focused light spots. The plurality of the phase patterns P20 differ from each other in the arrangement configuration of the regions where the multiple types of sub-patterns are located. In this case, the intensity information of each focused light spot may differ for the respective phase patterns P20. Thus, the incident position P2 of the incident light on the phase pattern P20 can be more easily estimated. Thus, the incident position P2 of the light L in the spatial light modulation unit 3 can be more easily estimated.

The intensity detection unit 22 may include an image-capture device that acquires an image of the focused light spots formed in the image-capture region. The captured image may include intensity information of the focused light spots and position information of the focused light spots. In this case, the estimation unit 35 estimates the incident position P2 of the light L in the spatial light modulation unit 3 on the basis of the intensity information of the focused light spots and position information of the focused light spots included in the captured image. The intensity information of the focused light spots can be easily classified by the position information of the focused light spots in the captured image. Thus, the incident position P2 of the incident light on the phase pattern P20 can be estimated more easily.

The processing device 1 includes the spatial light modulation device 10 and the processing unit 5. The processing unit 5 irradiates the workpiece S with the light L modulated by the spatial light modulation unit 3. In this case, the misalignment between the phase pattern P20 and the incident light on the phase pattern P20 can be suppressed by estimating the incident position P2 of the light L onto the spatial light modulation unit 3. According to the processing device 1, the light L modulated by the spatial light modulation unit 3 is guided not only to the intensity detection unit 22 but also to the workpiece S, so that the workpiece S can be processed more accurately by the light L modulated by the phase pattern.

The pattern setting unit 31 sets at least one of the phase pattern P20 used for the incident position estimation and the phase pattern P10 for processing as the phase pattern P1 to be displayed on the spatial light modulation unit 3. The phase pattern P20 is used to estimate the incident position. The phase pattern P10 is used for processing the workpiece S by the processing unit 5. In this case, the incident position P2 of the light L onto the spatial light modulation unit 3 is estimated by the phase pattern P20, and then the workpiece S can be processed by the phase pattern P10. Thus, the workpiece S can be processed in a state in which the misalignment between the phase pattern P10 and the light incident on the phase pattern P10 is suppressed.

The description mentioned above is given for the embodiments and modifications of the present invention, but the present invention is not necessarily limited to the above-mentioned embodiments, and various modifications are possible without departing from the technical spirit of the present invention.

For example, in the above-mentioned embodiments and modifications, the spatial light modulation device 10 is provided in the processing device 1. However, the spatial light modulation device 10 is acceptable to be configured separately from the processing device 1.

The processing device 1 is provided with an image-capture device 19 that captures an image the NFP. However, even if the processing device 1 does not have the image-capture device 19, the challenge that the present invention aims to solve can be solved.

REFERENCE SIGNS LIST 1 processing device
3 spatial light modulation unit
5 processing unit
7 detection unit
10 spatial light modulation device
22 intensity detection unit
P1, P10, P20, P21, P22, P25, P26 phase pattern
31 pattern setting unit
34 position adjustment unit
35 estimation unit
F1, F2, F3, F4, F11, F12, F13, F14, F21, F22, F23, F24
    focused light spot L light
P2 incident position
PS1, PS2, PS3, PS4, PS11, PS12, PS13, PS14, PS21, PS22, PS23, PS24 sub-pattern
R1, R2, R3, R4, R11, R12, R13, R14, R21, R22, R23, R24 region
S workpiece

The invention claimed is:

1. A spatial light modulation device comprising: a spatial light modulation unit configured to display a phase pattern used for modulating light being incident and modulates the light using the phase pattern;
    a pattern setting unit configured to set the phase pattern to be displayed on the spatial light modulation unit;
    a detection unit configured to detect light modulated by the spatial light modulation unit; and
    an estimation unit configured to estimate an incident position of the light onto the spatial light modulation unit, based on a detection result obtained by the detection unit,
    wherein the phase pattern being set by the pattern setting unit includes a phase pattern arranged to form a plurality of focused light spots on the detection unit by light modulated using the set phase pattern,
    the detection unit detects intensity information of the focused light spot, and
    the estimation unit estimates the incident position of the light onto the spatial light modulation unit, based on a comparison result obtained by comparing pieces of intensity information of the plurality of focused light spots detected by the detection unit.

2. The spatial light modulation device according to claim 1, wherein the estimation unit estimates the incident position of the light onto the spatial light modulation unit, based on a positional relationship between the phase pattern and the light incident on the phase pattern, and
    the positional relationship is a positional relationship where the intensities of at least two of the plurality of focused light spots are equal to each other.

3. The spatial light modulation device according to claim 1, wherein the estimation unit estimates the incident position of the light onto the spatial light modulation unit, based on a comparison result of intensity information of a pair of the focused light spots formed by light respectively incident on a pair of mutually adjacent regions in a first direction in the phase pattern and a comparison result of intensity information of a pair of the focused light spots formed by light respectively incident on a pair of mutually adjacent regions in a second direction in the phase pattern, and
    the first direction and the second direction intersect with each other.

4. The spatial light modulation device according to claim 1, further comprising: a position adjustment unit configured to adjust a positional relationship between the phase pattern and the incident light on the phase pattern, based on the intensity information of the focused light spot,
    wherein the detection unit further detects the intensity information of the plurality of focused light spots after the adjustment of the positional relationship by the position adjustment unit, and
    the estimation unit estimates the incident position of the light onto the spatial light modulation unit, based on a comparison result of the intensity information of the plurality of focused light spots detected after the adjustment of the positional relationship.

5. The spatial light modulation device according to claim 4, wherein the position adjustment unit adjusts the positional relationship by executing at least one of the following: changing the phase pattern to be displayed on the spatial light modulation unit and changing an optical axis position of the incident light on the phase pattern.

6. The spatial light modulation device according to claim 1, further comprising: a position adjustment unit configured to adjust a positional relationship between the phase pattern and the incident light on the phase pattern, based on the intensity information of the focused light spot, and wherein the position adjustment unit adjusts the positional relationship by executing at least one of the following: changing the phase pattern to be displayed on the spatial light modulation unit and changing an optical axis position of the incident light on the phase pattern.

7. The spatial light modulation device according to claim 4, wherein the position adjustment unit adjusts the positional relationship based on the intensity information of the plurality of focused light spots so that an intensity ratio between a pair of the plurality of focused light spots approaches a value of 1.

8. The spatial light modulation device according to claim 1, wherein the pattern setting unit sets a plurality of the phase patterns with different configurations as the phase pattern arranged to form the plurality of focused light spots on the detection unit, the spatial light modulation unit sequentially displays the plurality of phase patterns, and the estimation unit estimates the incident position of the light onto the spatial light modulation unit based on the intensity information of the focused light spot formed by each of the plurality of phase patterns.

9. The spatial light modulation device according to claim 8, wherein each of the plurality of phase patterns includes multiple types of sub-patterns that are located in different regions of the phase pattern and form different focused light spots, and the plurality of phase patterns differ in an arrangement configuration of the regions where the multiple types of sub-patterns are located.

10. The spatial light modulation device according to claim 1, wherein the detection unit includes an image-capture device that acquires a captured image of the focused light spot formed in an image-capture region, the captured image includes the intensity information of the focused light spot and position information of the focused light spot, and the estimation unit estimates the incident position of the light onto the spatial light modulation unit based on the intensity information and the position information of the focused light spot included in the captured image.

11. A processing device comprising: the spatial light modulation device according to claim 1; and the processing unit configured to irradiate a workpiece with light modulated by the spatial light modulation unit.

12. The processing device according to claim 11, wherein the pattern setting unit sets, as the phase pattern to be displayed on the spatial light modulation unit, at least one of a phase pattern for incident position estimation used to estimate the incident position and a phase pattern for processing used to process the workpiece by the processing unit.

13. A position estimation method comprising: displaying, in a spatial light modulation unit that modulates light being incident, a phase pattern arranged to form a plurality of focused light spots in response to the incidence of the light;

making light incident on the phase pattern;

detecting intensity information of the plurality of focused light spots formed by the incidence of the light;

comparing pieces of the intensity information of the detected plurality of focused light spots; and estimating an incident position of the light onto the spatial light modulation unit based on a comparison result obtained from the intensity information of the plurality of focused light spots.

* * * * *